(12) United States Patent
Morikawa et al.

(10) Patent No.: US 10,181,608 B2
(45) Date of Patent: Jan. 15, 2019

(54) FUEL CELL STACK AND FUEL CELL MODULE

(71) Applicant: NGK SPARK PLUG CO., LTD., Nagoya-shi, Aichi (JP)

(72) Inventors: Tetsuya Morikawa, Ichinomiya (JP); Nobuyuki Hotta, Konan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 265 days.

(21) Appl. No.: 15/037,422

(22) PCT Filed: Dec. 10, 2014

(86) PCT No.: PCT/JP2014/082676
§ 371 (c)(1),
(2) Date: May 18, 2016

(87) PCT Pub. No.: WO2015/087913
PCT Pub. Date: Jun. 18, 2015

(65) Prior Publication Data
US 2016/0293980 A1    Oct. 6, 2016

(30) Foreign Application Priority Data

Dec. 11, 2013   (JP) .................................. 2013-256388

(51) Int. Cl.
| | | |
|---|---|---|
| *H01M 8/04082* | (2016.01) | |
| *H01M 8/04007* | (2016.01) | |
| *H01M 8/2425* | (2016.01) | |
| *H01M 8/04014* | (2016.01) | |
| *H01M 8/2457* | (2016.01) | |
| *H01M 8/04089* | (2016.01) | |
| *H01M 8/248* | (2016.01) | |

(Continued)

(52) U.S. Cl.
CPC ... *H01M 8/04201* (2013.01); *H01M 8/04014* (2013.01); *H01M 8/04067* (2013.01);
(Continued)

(58) Field of Classification Search
CPC .................................................. H01M 8/2483
See application file for complete search history.

(56) References Cited

U.S. PATENT DOCUMENTS

| | | |
|---|---|---|
| 2006/0257709 A1 | 11/2006 | Blum et al. |
| 2011/0171554 A1 | 7/2011 | Hayashi et al. |
| 2015/0030949 A1 | 1/2015 | Ishikawa et al. |

FOREIGN PATENT DOCUMENTS

| | | |
|---|---|---|
| JP | 4-181657 A | 6/1992 |
| JP | 7-22059 A | 1/1995 |

(Continued)

OTHER PUBLICATIONS

Furusaki Keizo, WO 2008153073-A1 (Dec. 2008), machine translation.*

(Continued)

*Primary Examiner* — Carlos Barcena
(74) *Attorney, Agent, or Firm* — Sughrue Mion, PLLC

(57) ABSTRACT

A fuel cell stack according to one aspect of the present invention has a plurality of fuel cells stacked together and a plurality of manifolds passing through the fuel cells in a stacking direction thereof so as to allow at least one of the fuel gas and the oxidant gas to flow therethrough. The manifolds include cold gas manifolds adapted to introduce the fuel gas or oxidant gas from the outside into the fuel cell stack, hot gas manifolds adapted to discharge the fuel gas or oxidant gas from the fuel cells, and a heat-exchanged gas manifold adapted to feed the fuel gas or oxidant gas that has been heat-exchanged in a heat exchange part. Every one of the cold gas manifolds is adjacent to any of the hot gas manifolds. One of the hot gas manifolds is non-adjacent to any other one of the hot gas manifolds.

7 Claims, 17 Drawing Sheets

(51) Int. Cl.
*H01M 8/2483* (2016.01)
*H01M 8/124* (2016.01)
(52) U.S. Cl.
CPC ... *H01M 8/04074* (2013.01); *H01M 8/04089* (2013.01); *H01M 8/248* (2013.01); *H01M 8/2425* (2013.01); *H01M 8/2457* (2016.02); *H01M 8/2483* (2016.02); *H01M 2008/1293* (2013.01)

(56) References Cited

FOREIGN PATENT DOCUMENTS

| | | |
|---|---|---|
| JP | 2001-256993 A | 9/2001 |
| JP | 2002-260708 A | 9/2002 |
| JP | 2010-165629 A | 7/2010 |
| WO | 2008/153073 A1 | 12/2008 |
| WO | 2010/038869 A1 | 4/2010 |
| WO | 2013/065757 A1 | 5/2013 |

OTHER PUBLICATIONS

Communication dated Jun. 9, 2017, issued from the Europe Patent Office in corresponding European Application No. 14869312.0.
International Preliminary Report on Patentability with translation of Written Opinion dated Jun. 14, 2016, issued by the International Searching Authority in corresponding International Application No. PCT/JP2014/082676.
International Search Report of PCT/JP2014/082676 dated Jan. 27, 2015.

* cited by examiner

FUEL CELL STACK AND FUEL CELL MODULE

CROSS REFERENCE TO RELATED APPLICATIONS

This is a National Stage of Application No. PCT/JP2014/082676 filed Dec. 10, 2014, claiming priority based on Japanese Patent Application No. 2013-256388 filed Dec. 11, 2013, the contents of all of which are incorporated herein by reference in their entirety.

FIELD OF THE INVENTION

The present invention relates to a fuel cell stack having stacked therein a plurality of fuel cells, each provided with an electrolyte layer, a fuel electrode layer and an air electrode layer, and to a fuel cell module equipped with such a fuel cell stack.

BACKGROUND ART

As a fuel cell, there is conventionally known a solid oxide fuel cell (hereinafter sometimes abbreviated as "SOFC") using a solid electrolyte (solid oxide).

One known use of SOFC is as a fuel cell stack, which has stacked therein a plurality of fuel cells, each including a plate-shaped solid electrolyte layer (solid oxide layer), a fuel electrode layer disposed on one side of the solid electrolyte layer and an air electrode layer disposed on the other side of the solid electrolyte layer.

The SOFC is so configured as to generate electrical power by supplying fuel gas and air to the fuel electrode layer and the air electrode layer, respectively, and causing chemical reaction of the fuel and oxygen in the air through the solid electrolyte layer.

It has been proposed to provide the SOFC with a serial fuel gas flow structure for improvement of fuel utilization rate (see Patent Document 1). The serial fuel gas flow structure allows a flow of the fuel gas to some fuel cells in parallel with a flow of the fuel gas discharged from these some fuel cells to the other fuel cells in the fuel cell stack.

Further, there has recently been proposed a technique in which a plurality of manifolds are formed through the fuel cell stack in a stacking direction thereof such that the fuel gas and air are supplied to or discharged from the respective fuel cells through the manifolds (see Patent Documents 2 and 3).

PRIOR ART DOCUMENTS

Patent Documents

Patent Document 1: Japanese Laid-Open Patent Publication No. 2001-256993
Patent Document 2: International Publication No. 2008/153073
Patent Document 3: International Publication No. 2010/038869

SUMMARY OF THE INVENTION

Problems to be Solved by the Invention

However, the above-mentioned conventional technique has the following problems and is in need of improvements.

In Patent Documents 2 and 3, the plurality of manifolds are formed through the fuel cell stack in the stacking direction so as to allow gas flows of different temperatures. The temperatures of these gas flows vary from a low temperature degree to a high temperature degree. There thus arises differences in temperature between parts of the fuel cells surrounding the respective manifolds.

More specifically, the surrounding temperatures of the respective manifolds are largely different because each of the manifolds allows a flow of low-temperature fuel gas or air introduced from the outside, a flow of fuel gas or air raised in temperature by heat exchange in the fuel cell stack or a flow of fuel gas or air raised to higher temperature by reaction in the fuel cells.

Due to such differences between the surrounding temperatures of the manifolds, an in-plane temperature distribution occurs in the fuel cells. This results in deterioration of cell power generation stability and durability. Namely, the occurrence of an in-plane temperature distribution in the fuel cells leads to a cell in-plane resistance distribution and thereby leads to a cell in-plane current and voltage distribution. As a result, there arises a lateral flow of current within the planes of the fuel cells (i.e. in-plane flow of current in the fuel cells) so that the fuel cells cannot stably obtain high power output.

In particular, the manifolds through which the low-temperature cold gas flows induce a large temperature decrease to cause increase of in-plane resistance. The above problem becomes more pronounced by such cold gas flow manifolds. Further, metal members of the fuel cells deteriorate when parts of the fuel cells become excessively high in temperature due to the in-plane temperature distribution of the fuel cells.

It is accordingly a desirable objective of the present invention to provide a fuel cell stack and fuel cell module capable of uniformizing the temperature of fuel cells in a plane direction.

Means for Solving the Problems

According to a first aspect of the present invention, there is provided a fuel cell stack comprising a plurality of fuel cells stacked together in a stacking direction, each of the fuel cells having a solid electrolyte layer, a fuel electrode layer disposed on one side of the solid electrolyte layer and brought into contact with fuel gas and an air electrode layer disposed on the other side of the solid electrolyte layer and brought into contact with oxidant gas, the fuel cell stack having a structure that allows at least one of the fuel gas and the oxidant gas to flow into a part of the fuel cells in the staking direction and allows at least one of the fuel gas and the oxidant gas discharged from the part of the fuel cells to flow into the remaining part of the fuel cells, wherein the fuel cell stack comprises a plurality of manifolds passing through the fuel cells in the stacking direction so as to allow at least one of the fuel gas and the oxidant gas to flow therethrough;

wherein the manifolds include:

cold gas manifolds each adapted to introduce the fuel gas or the oxidant gas from the outside into the fuel cell stack;

hot gas manifolds each adapted to discharge the fuel gas or the oxidant gas from the fuel cells; and a heat-exchanged gas manifold adapted to feed at least one of the fuel gas and the oxidant gas that has been heat-exchanged in a heat exchange part; and wherein, when the fuel cell stack is viewed in the stacking direction, the manifolds are arranged such that every one of the cold gas manifolds is adjacent to any of the hot gas manifolds and such that one of the hot gas manifolds is non-adjacent to any other one of the hot gas manifolds.

In the fuel cell stack according to the first aspect, the manifolds are provided in the fuel cell stack so as to allow the fuel gas and the oxidant gas to flow in the stacking direction. These manifolds include: the cold gas manifolds each adapted to introduce the fuel gas or the oxidant gas from the outside into the fuel cell stack; the hot gas manifolds each adapted to introduce the fuel gas or the oxidant gas from the fuel cells; and the heat-exchanged gas manifold adapted to feed at least one of the fuel gas and the oxidant gas that has been subjected to heat exchange in the heat exchange part. When the fuel cell stack is viewed in the stacking direction (i.e. viewed in plan), the manifolds are arranged such that every one of the cold gas manifolds is adjacent to any of the hot gas manifolds and such that one of the hot gas manifolds is not adjacent to any other one of the hot gas manifolds.

Namely, all of the manifolds through each of which the fuel gas or the oxidant gas flows as cold gas of low temperature are adjacent to the manifolds through each of which the fuel gas or the oxidant gas flows as hot gas of higher temperature than the cold gas; and each of the hot gas manifolds is not adjacent to any other one of the hot gas manifolds. This manifold arrangement enables decrease of temperature difference in a plane direction of the fuel cells (i.e. a direction in which the fuel cells extend when viewed in plan) so as to secure a uniform temperature of the fuel cells (that is, a uniform temperature of the fuel cell stack) in the plane direction.

It is therefore possible to reduce the in-plane temperature distribution of the fuel cells for reduction of cell in-plane resistance distribution and cell in-plane current and voltage distribution. In consequence, the fuel cell stack is able to obtain significant effects of stable high power output by prevention of in-plane current flow in the fuel cells.

As the hot gas manifolds are not adjacent to each other, the in-plane temperature distribution of the fuel cells is effectively reduced to thereby reduce the tendency for excessively high temperature regions to occur in the fuel cells. It is thus advantageously possible to suppress deterioration of metal members in the fuel cell stack.

Herein, the "heat-exchanged gas" refers to gas after subjected to heat exchange, i.e., gas having a temperature between the temperature of gas (cold gas) before subjected to heat exchange and the temperature of gas (hot gas) after used for power generation (e.g. immediately after discharged from the fuel cells).

The "cold gas" refers to gas introduced from the outside of the fuel cell stack, i.e., gas having a temperature lower than the temperature of heat-exchanged gas and lower than a power generation temperature of the fuel cell stack.

During the heat exchange of the fuel gas or oxidant gas with surrounding structural means (e.g. fuel cell) in the heat exchange part, the fuel gas or oxidant gas is generally not used for power generation.

The manifolds are provided as inner gas flow passages passing through the plurality of fuel cells in the stacking direction for the flows of the fuel gas and the oxidant gas in the fuel cell stack. These manifolds are communicated with fuel gas or oxidant gas flow passages of the fuel cells through branch channels (such as communication holes).

More specifically, the fuel gas or oxidant gas manifolds are provided as passages for allowing the fuel gas or oxidant gas to flow in the stacking direction of the fuel cell stack and supplying the fuel gas or oxidant gas to the fuel cells or discharging the fuel gas or oxidant gas from the fuel cells. The heat-exchanged gas manifold is provided as a passage for, after the heat exchange of the gas in the heat exchange part, feeding the resulting heat-exchanged gas to the fuel cells. The heat-exchanged gas is preferably at least the oxidant gas.

It is feasible to constitute the fuel cell stack by stacking only the fuel cells or by stacking the fuel cells and any other structural means such as auxiliary equipment e.g. fuel gas reformer. Further, the heat exchange part may be located inside or outside the fuel cell stack.

(2) According to a second aspect of the present invention, there is provided a fuel cell stack as described above, wherein the heat exchange part is located inside the fuel cell stack to perform heat exchange with any of the fuel cells adjacent to the heat exchange part.

In the fuel cell stack according to the second aspect, a preferable location of the heat exchange part is exemplified. By such location, it is possible for the heat exchange part to efficiently perform heat exchange of the fuel gas or oxidant gas with the surrounding fuel cell.

(3) According to a third aspect of the present invention, there is provided a fuel cell stack as described above, wherein, when the fuel cell stack is viewed in the stacking direction, at least either of the heat-exchanged gas manifold and the cold gas manifolds is adjacent to each of the hot gas manifolds.

In the fuel cell stack according to the third aspect, at least either of the heat-exchanged gas manifold and the cold gas manifolds is adjacent to the hot gas manifold when the fuel cell stack is viewed in plan.

Namely, the highest-temperature hot gas manifold is adjacent to at least either the lower-temperature heat-exchanged gas manifold or the low-temperature cold gas manifold. It is thus possible to effectively uniformize the temperature of the fuel cells in the plane direction.

(4) According to a fourth aspect of the present invention, there is provided a fuel cell stack as described above, wherein, when the fuel cell stack is viewed in the stacking direction, at least any of the heat-exchanged gas manifold and the cold gas manifolds are adjacent to both sides of each of the hot gas manifolds.

In the fuel cell stack according to the fourth aspect, any of the heat-exchanged gas manifold and the cold gas manifolds are adjacent to both sides of the hot gas manifold. It is thus possible to more uniformize the temperature of the fuel cells in the plane direction.

The respective manifolds may be arranged in a queue when viewed in plan. Herein, the expression "arrange in a queue" includes not only the case where the queue is straight the but also the case where the queue is bent at some point.

(5) According to a fifth aspect of the present invention, there is provided a fuel cell stack as described above, wherein, when the fuel cell stack is viewed in the stacking direction, the cold-gas manifold for the oxidant gas is adjacent to the hot-gas manifold for the oxidant gas.

In general, the temperature of the hot oxidant gas is higher than the temperature of the other gas (cold gas or heat-exchanged gas). Further, the amount of the oxidant gas supplied is larger than the amount of the fuel gas supplied.

In the fuel cell stack according to the firth aspect, the cold oxidant gas manifold is adjacent to the hot oxidant gas manifold. It is thus possible to effectively decrease the surrounding temperature of the hot oxidant gas manifold and more uniformize the temperature of the fuel cells in the plane direction.

(6) According to a sixth aspect of the present invention, there is provided a fuel cell stack as described above, wherein, when the fuel cell stack is viewed in the stacking direction, the hot-gas manifolds are adjacent to both sides of the cold-gas manifold for the oxidant gas.

In the sixth aspect of the present invention, the hot gas manifolds are adjacent to both sides of the cold oxidant gas manifold. As the oxidant gas is generally supplied in a larger amount than the fuel gas, it is possible by such arrangement to effectively maintain the surrounding temperature of the cold gas manifold and more uniformize the temperature of the fuel cells in the plane direction.

The respective manifolds may be arranged in a queue when viewed in plan.

(7) According to a seventh aspect of the present invention, there is provided a fuel cell module with a fuel cell stack according to any one of the first to sixth aspects of the present invention.

In the seventh aspect of the present invention, the fuel cell module is provided with the above-mentioned fuel cell stack.

Herein, the fuel cell module includes not only the fuel cell stack but also e.g. a thermal insulation case and a burner accommodated in the thermal insulation case for power generation.

The fuel cell stack may have a plurality of through holes passing through the fuel cells in the stacking direction such that all of the through holes serve as the manifolds for the flows of the fuel gas or oxidant gas.

In the case where all of the through holes are used as the fuel gas or oxidant gas manifolds, it is advantageously possible to more uniformize the temperature of the fuel cells in the plane direction.

The manifolds can be provided in the form of through holes passing through the fuel cell stack in the stacking direction. In this case, it is advantageously possible to supply the fuel gas and the oxidant gas through the manifolds up to both ends of the fuel cell stack in the stacking direction and thereby uniformize the temperature of the fuel cells in the plane direction.

Figure 1:
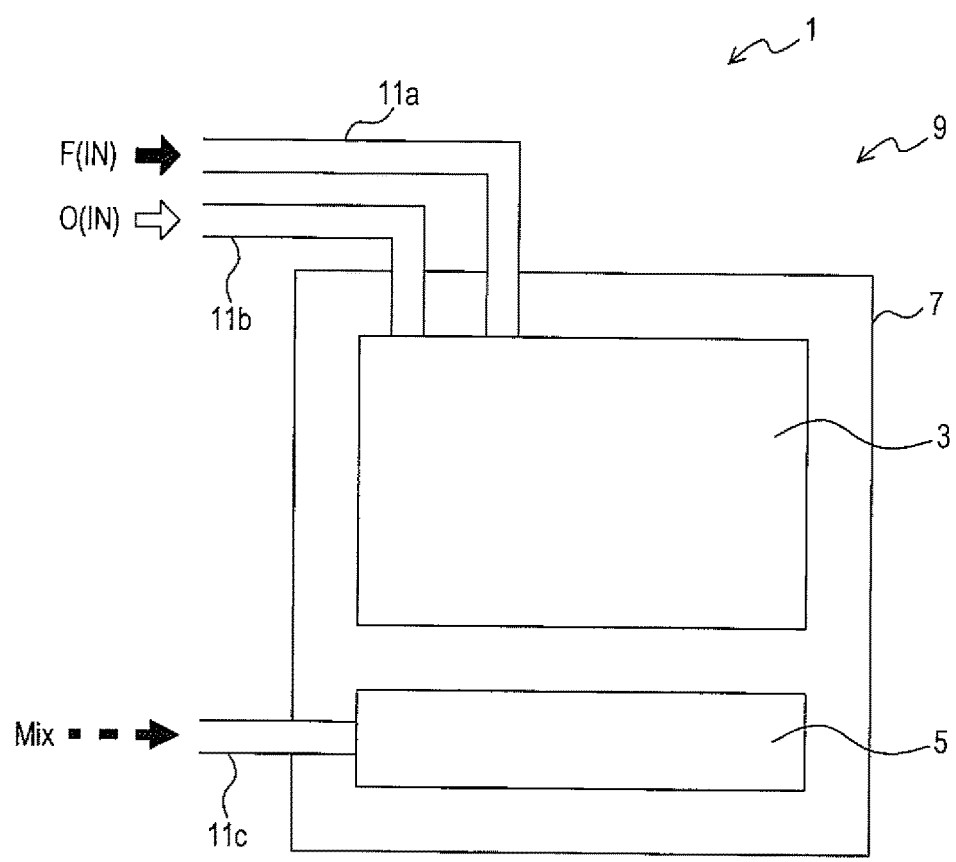
FIG. 1 is a schematic diagram of a fuel cell system equipped with a fuel cell stack according to a first embodiment of the present invention.

DESCRIPTION OF REFERENCE NUMERALS 3, 111, 121, 131: Fuel cell stack
9: Fuel cell module
13: Fuel cell
15, 15a, 15b, 133: Heat exchange part
41a, 41b, 41c, 41d, 41e, 41f, 41g, 41h: Inner gas flow passage (Manifold)
51: Solid electrolyte layer
52: Fuel electrode layer
53: Air electrode layer Description of Embodiments Exemplary embodiments (examples) of the present invention, each of which refers to a solid oxide type fuel cell stack and solid oxide type fuel cell module, will be described below.

[First Embodiment]

a) First, a solid oxide type fuel cell system with a solid oxide type fuel cell stack according to the first embodiment of the present invention will be explained below. Hereinafter, the wording "solid oxide type" will be omitted for simplification purposes.

As shown in FIG. 1, the fuel cell system 1 includes a fuel cell module 9 in which the fuel cell stack 3 is accommodated together with a burner 5 in a thermal insulation case 7 so as to generate electrical power by supply of fuel gas (such as hydrogen: F) and oxidant gas (such as air (more specifically, oxygen in the air): O) to the fuel cell stack 3. In the following explanation, top and bottom sides of FIG. 1 are referred to as upper and lower sides of the fuel cell stack 3, respectively.

The fuel cell system 1 has lines 11a and 11b for supplying fuel gas and oxidant gas from the outside of the thermal insulation case 7 to the fuel cell stack 3, respectively, and a line 11c for supplying a mixture (Mix) of fuel gas and air to the burner 5 for heating of the fuel cell stack 3.

The fuel gas and the oxidant gas, discharged from the fuel cell stack 3 after use for power generation, may be burned within the thermal insulation case 7 and then released to the outside of the thermal insulation case 7 or may be released as it is to the outside of the thermal insulation case 7.

Figure 2A:
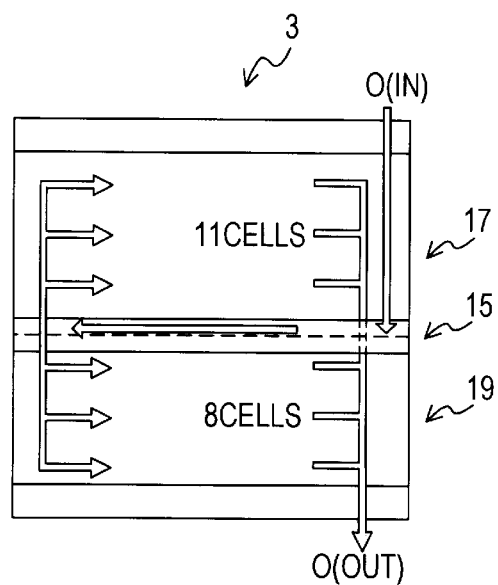
FIG. 2A is a section view of the fuel cell stack taken in a stacking direction thereof, schematically showing a flow path of oxidant gas, according to the first embodiment of the present invention.
Figure 2B:
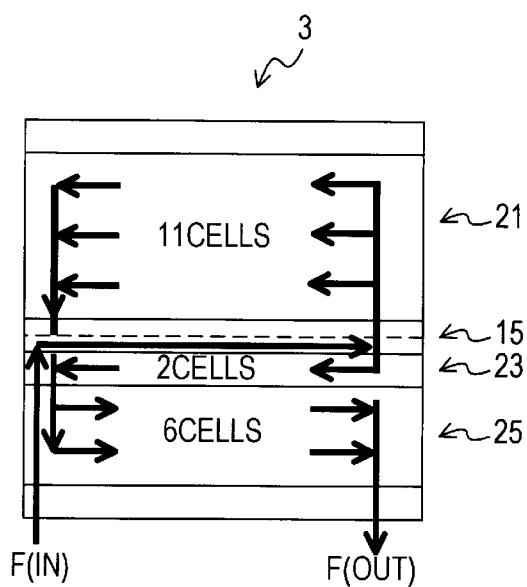
FIG. 2B is a section view of the fuel cell stack taken in the stacking direction, schematically showing a flow path of fuel gas, according to the first embodiment of the present invention.

As shown in FIGS. 2A and 2B, flow paths of the fuel gas and the oxidant gas within the fuel cell stack 3 are largely different in a direction of stacking of fuel cells 13 (see FIGS. 3A and 3B) (i.e. vertical direction in FIG. 2A, 2B) in the first embodiment as will be explained in detail later.

The oxidant gas is introduced from the outside to the inside of the fuel cell stack 3, fed through a heat exchange part 15 inside the fuel cell stack 3 (in the first embodiment, a middle region of the fuel cell stack 3), introduced to first and second oxidant-gas-side end blocks 17 and 19 on upper and lower sides of the heat exchange part 15, merged together and then discharged to the outside.

Herein, the middle region of the fuel cell stack 3 refers to a region located between fuel cells 13 at positions than the vicinities of both ends of the fuel cell stack 3 in the stacking direction (e.g. a region between any other than both outermost fuel cells 13).

On the other hand, the fuel gas is introduced from the outside to the inside of the fuel cell stack 3, fed through a heat exchange part 15 inside the fuel cell stack 3 (in the first embodiment, a middle region of the fuel cell stack 3), introduced to first and second fuel-gas-side end blocks 21 and 23 on upper and lower sides of the heat exchange part 15, merged together, fed to a third fuel-gas-side end block 25 and then discharged to the outside.

The respective structural components will be explained below.

Figure 3A:
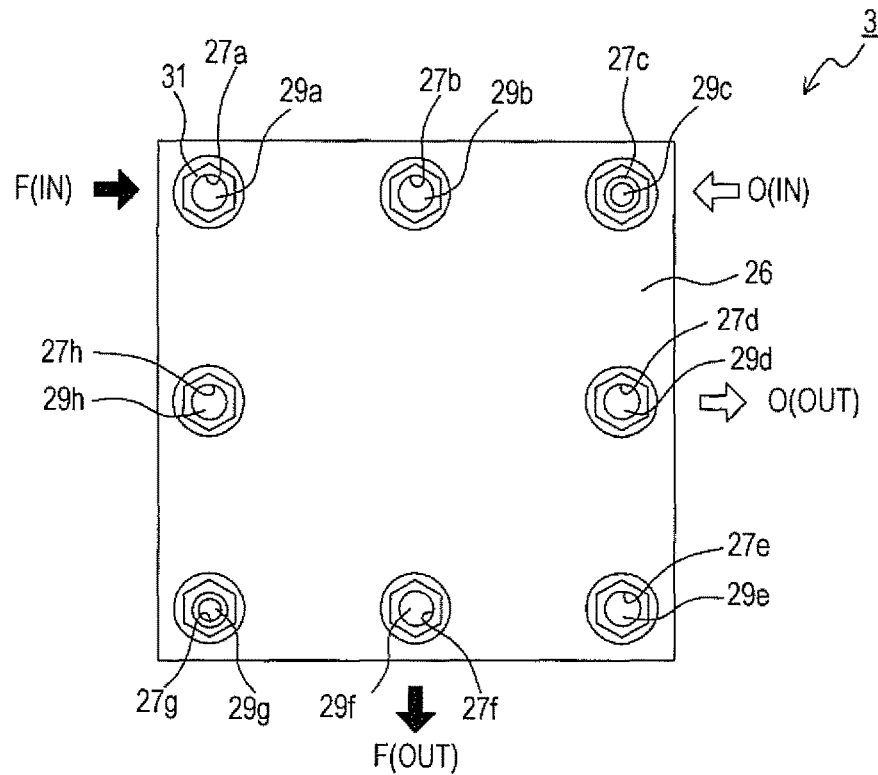
FIGS. 3A and 3B are a plan view and an elevation view of the fuel cell stack according to the first embodiment of the present invention, respectively.
Figure 3B:
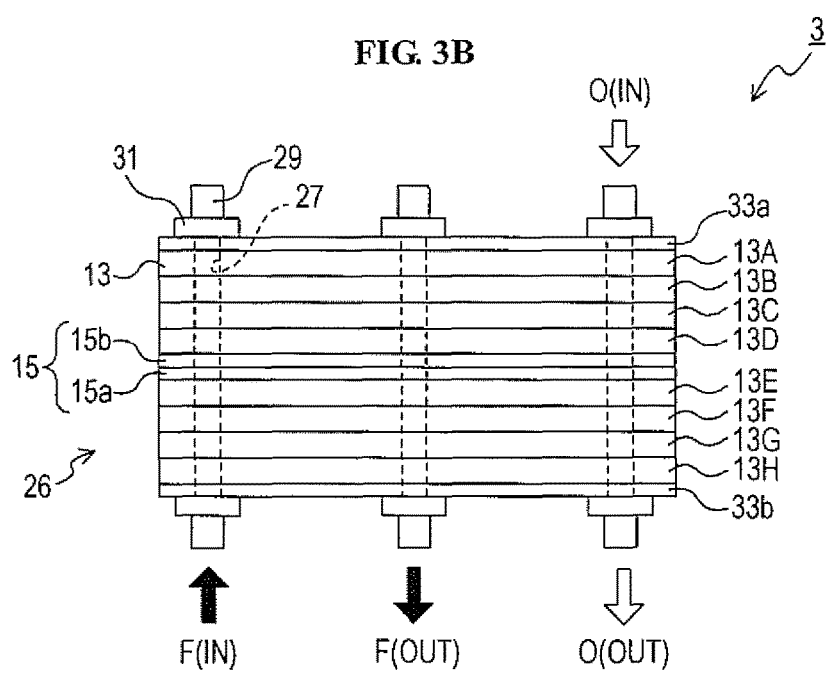

As shown in FIGS. 3A and 3B, the fuel cell stack 3 has a fuel cell stack body 26 in which a plurality of plate-shaped fuel cells 13 are stacked together in a thickness direction thereof as power generation cells, eight bolt insertion holes 27a to 27h (generically numbered "27") passing through the fuel cell stack body 26 in the stacking direction (i.e. vertical direction in FIGS. 3A, 3B), eight bolts 29a to 29h (generically numbered "29") inserted through the respective bolt insertion holes 27 and nuts 31 screwed onto the respective bolts 29.

As the heat exchange parts 15, there are provided a plate-shaped fuel gas heat exchange part 15a for preheating of the fuel gas and a plate-shaped oxidant gas heat exchange part 15b for preheating of the oxidant gas in the middle region of the fuel cell stack 3 in the stacking direction as shown in FIG. 3B. A pair of end plates 33a and 33b, which serve as collectors, are disposed at both ends of the fuel cell stack 3 in the stacking direction.

In the first embodiment, the heat exchange parts 15 are arranged in the middle region of the fuel cell stack 3 in the stacking direction. The location of the heat exchange parts 15 is not however limited to such a middle region. It is alternatively feasible to arrange the heat exchange parts 15 in any region other than the middle region of the fuel cell stack 3, such as end region of the fuel cell stack 3, in the stacking direction.

Although the fuel cell stack 3 is provided with a plurality of stages (e.g. 19 stages; 19 cells), the following explanation will be given on the assumption that the fuel cell stack 3 is provided with eight stages for simplification purposes.

The fuel cells 13 of the respective stages are designated as 13A to 13H in this order from the upper side. The fuel cells 13A, 13B, 13C and 13D are located on the upper side of the heat exchange parts 15, whereas the fuel cells 13E, 13F, 13G and 13H are located on the lower side of the heat exchange parts 15. As to the flow path of the oxidant gas (see FIG. 2A), the first end block 17 corresponds to the fuel cells 13A to 13D; and the second end block 19 corresponds to the fuel cells 13E to 13H. As to the flow path of the fuel gas (see FIG. 2B), the first end block 21 corresponds to the fuel cells 13A to 13D; the second end block 23 corresponds to the fuel cell 13E; and the third end block corresponds to the fuel cells 13F to 13H.

The bolts 29 are arranged to pass through the fuel cell stack 3 in the stacking direction. The nuts 31 are screwed onto opposite ends of the respective bolts 29. By screwing of the nuts 31 onto the bolts 29, the fuel cell stack body 26 is tightened and integrally fixed in the stacking direction. Although the nuts 31 are screwed onto both ends of the bolt 29 in the first embodiment, it is alternatively feasible to form a bolt head on one end of the bolt 29 and screw the nut 31 on the other end of the bolt 29.

In the first embodiment, the fuel cell stack is adapted to introduce the fuel gas from the lower side of the first bolt 29a (F(IN)), discharge the reacted fuel gas from the lower side of the sixth bolt 29f (F(OUT)), introduce the oxidant gas from the upper side of the third bolt 29c (O(IN)) and discharge the reacted oxidant gas from the lower side of the fourth bolt 29d (O(OUT)) as will be explained below in detail.

It is herein noted that the bolt insertion holes 27 and the bolts 29 are numbered first to eighth in a clockwise direction from the upper left corner in FIG. 3A (the same applies to the similar structural components).

b) Next, the configuration of the bolts 29 will be explained below.

Hollow inner gas flow passages 41a to 41h (generically numbered "41") are axially formed as manifolds through the bolts 29 (see FIGS. 4 and 5) such that the fuel gas or oxidant gas flows through these inner gas flow passages 41.

Figure 4:
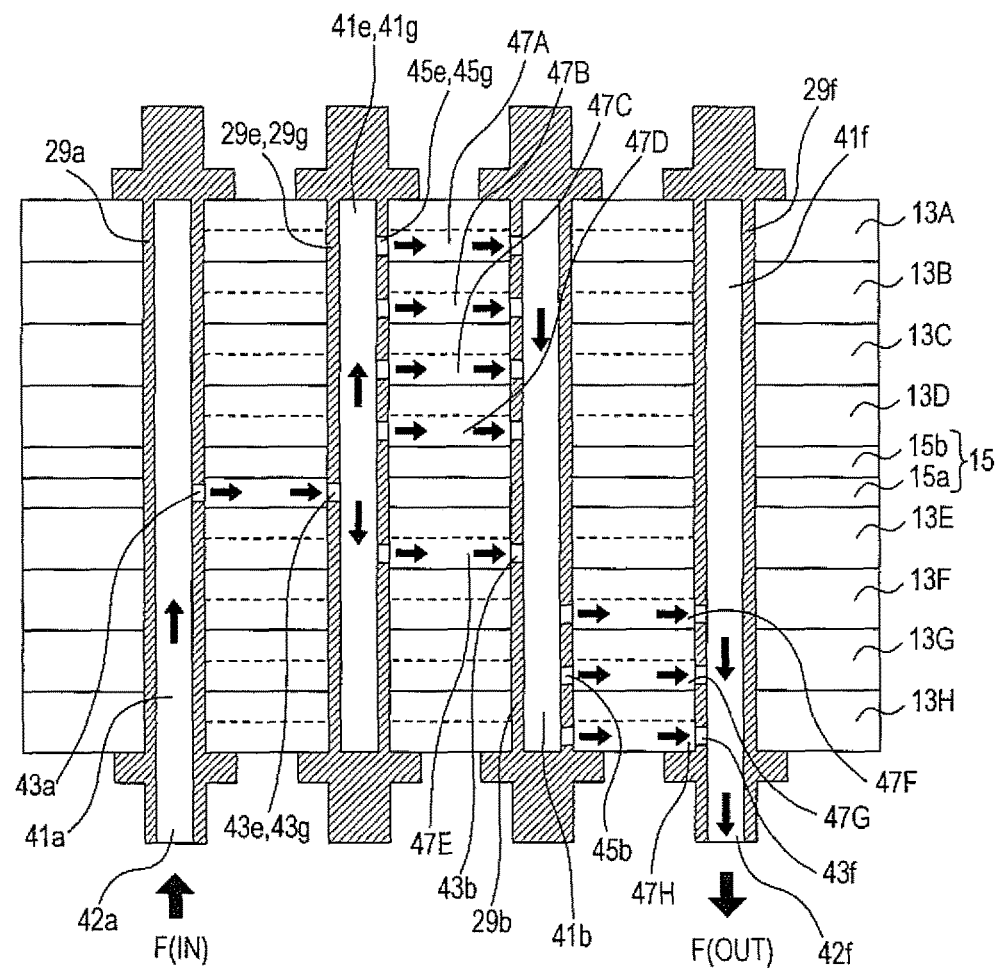
FIG. 4 is a section view of the fuel cell stack taken along fuel gas manifolds in the stacking direction, schematically showing the flow of fuel gas, according to the first embodiment of the present invention.
Figure 5:
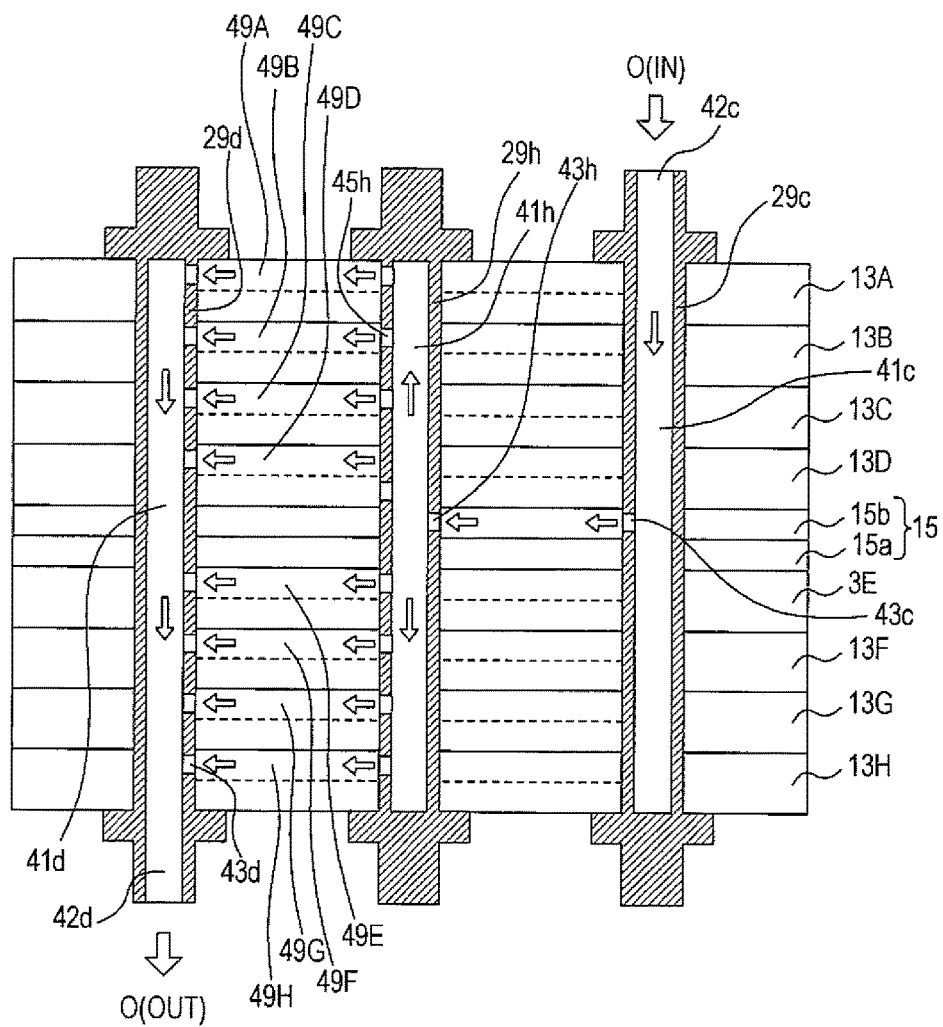
FIG. 5 is a section view of the fuel cell stack taken along air manifolds in the stacking direction, schematically showing the flow of oxidant gas, according to the first embodiment of the present invention.

Among the inner gas flow passages of the first to eighth bolts 29a to 29h, the inner gas flow passages 41a, 41b, 41e, 41f and 41g of the first, second, fifth, sixth and seventh bolts 29a, 29b, 29e, 29f and 29g are used for the flow of the fuel gas (as indicated by black arrows in FIG. 4); and the inner gas flow passages 41c, 41d and 41h of the third, fourth and eighth bolts 29c, 29d and 29h are used for the flow of the oxidant gas (as indicated by white arrows in FIG. 5).

The respective gas flow path configurations will be explained below in detail.

<Fuel Gas Flow Path>

As shown in FIG. 4, the inner gas flow passage 41a for the fuel gas is formed in the first bolt 29a. This inner gas flow passage 41a is in communication with the outside (i.e. the lower side of the fuel cell stack 3) through an opening 42a such that the fuel gas flows from the outside into the inner gas flow passage 41a.

A lateral outlet hole 43a is formed as a through hole in the first bolt 29a so as to extend radially and communication with the inner gas flow passage 41a. The lateral outlet hole 43a is in communication with the fuel gas heat exchange part 15 a.

The inner gas flow passages 41e and 41g for the fuel gas are respectively formed in the fifth and seventh bolts 29e and 29g (although only one bolt is shown in FIG. 4). Upper and lower ends of the inner gas flow passages 41e and 41g are closed.

A lateral inlet hole 43e, 43g and a plurality of lateral outlet holes 45e, 45g are formed as through holes in each of the fifth and seventh bolts 29e and 29g so as to extend radially and communicate with the inner gas flow passage 41e, 41g. The lateral inlet hole 43e, 43g is in communication with the fuel gas heat exchange part 15a. The lateral outlet holes 45e, 45g are in communication with fuel gas flow passages 47A to 47E (generically numbered "47") of the first to fifth fuel cells 13A to 13E, respectively.

The inner gas flow passage 41b for the fuel gas is formed in the second bolt 29b. Upper and lower ends of the inner gas flow passage 41b are closed.

A plurality of lateral inlet holes 43b and a plurality of lateral outlet holes 45b are formed as through holes in the second bolt 29b so as to extend radially and communicate with the inner gas flow passage 41b. The lateral inlet holes 43b are in communication with the fuel gas flow passages 47A to 47E of the first to fifth fuel cells 13A to 13E, respectively. The lateral outlet holes 45b are in communication with fuel gas flow passages 47F to 47H of the sixth to eighth fuel cells 13F to 13H, respectively.

The inner gas flow passage 41f for the fuel gas is formed in the sixth bolt 29f. This inner gas flow passage 41f is in communication with the outside (i.e. the lower side of the fuel cell stack 3) through an opening 42f such that the reacted fuel gas flows out from the inner gas flow passage 41f to the outside.

A plurality of lateral inlet holes 43f are formed in the sixth bolt 29f so as to extend radially and communicate with the inner gas flow passage 41f. The lateral inlet holes 43f are in communication with the fuel gas flow passages 47F to 47H of the sixth to eighth fuel cells 13F to 13H, respectively.

<Oxidant Gas Flow Path>

As shown in FIG. 5, the inner gas flow passage 41c for the oxidant gas is formed in the third bolt 29c. This inner gas flow passage 41c is in communication with the outside (i.e. the upper side of the fuel cell stack 3) through an opening 42c such that the oxidant gas flows from the outside into the inner gas flow passage 41c.

A lateral outlet hole 43c is formed as a through hole in the third bolt 29c so as to extend radially and communication with the inner gas flow passage 41c. The lateral outlet hole 43c is in communication with the oxidant gas heat exchange part 15b.

The inner gas flow passage 41h for the oxidant gas is formed in the eighth bolt 29h. Upper and lower ends of the inner gas flow passage 41h are closed.

A plurality of lateral inlet holes 43h and a plurality of lateral outlet holes 45h are formed as through holes in the eighth bolt 29h so as to extend radially and communicate with the inner gas flow passage 41h. The lateral inlet holes 43h are in communication with the oxidant gas heat exchange part 15b. The lateral outlet holes 45h are in communication with air flow passages 49A to 49H (generically numbered "49") of the first to eighth fuel cells 13A to 13H, respectively.

The inner gas flow passage 41d for the oxidant gas is formed in the fourth bolt 29d. This inner gas flow passage 41d is in communication with the outside (i.e. the lower side of the fuel cell stack 3) through an opening 42d such that the reacted oxidant gas flows out from the inner gas flow passage 41d to the outside.

A plurality of lateral inlet holes 43d are formed in the fourth bolt 29d so as to extend radially and communicate with the inner gas flow passage 41d. The lateral inlet holes 43d are in communication with the air flow passages 49A to 49H of the first to eighth fuel cells 13F to 13H, respectively.

c) The configuration of the fuel cells 13 will be next explained below.

Figure 6:
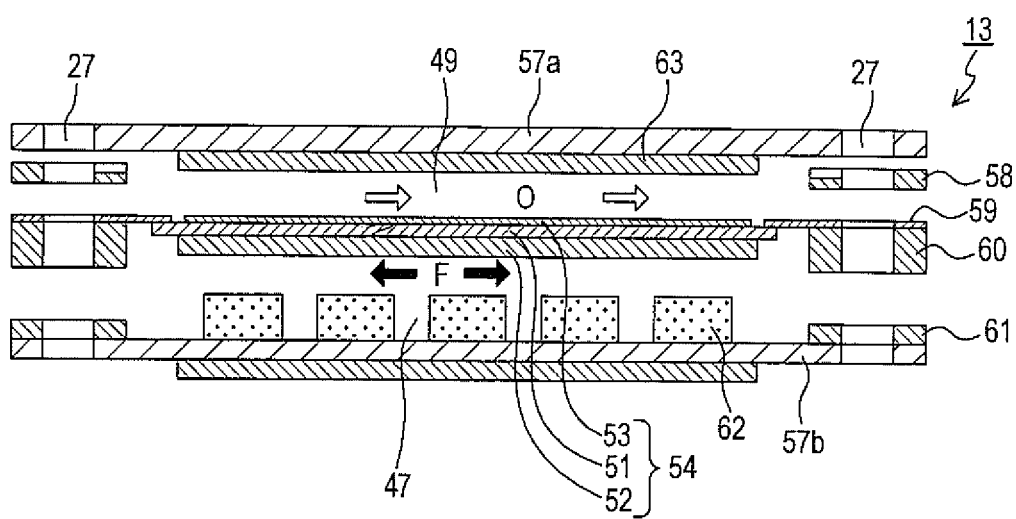
FIG. 6 is a schematic section view of the fuel cell taken in a thickness direction of the fuel cell and in a flow direction of oxidant gas according to the first embodiment of the present invention.

As shown in FIG. 6, the fuel cells 13 are configured as plate-shaped cells of so-called fuel electrode supporting film type.

Each of the fuel cells 13 has a film-shaped solid electrolyte layer 51, a fuel electrode layer 52 (as an anode: AN) disposed on one side of the solid electrolyte layer and a film-shaped air electrode layer 53 (as a cathode: CA) disposed on the other side of the solid electrolyte layer. The solid electrolyte layer 51, the fuel electrode layer 52 and the air electrode layer 53 serve together as a single cell element 54. The air flow passage 49 is provided on an air electrode layer 53 side of the single cell element 54, whereas the fuel gas flow passage 47 is provided on a fuel electrode layer 52 side of the single cell element 54.

Each of the fuel cells 13 also has a pair of upper and lower interconnectors 57a and 57b, a plate-shaped gas seal 58 arranged on the air electrode layer 53 side, a frame-shaped separator 59 joined to an upper surface of an outer peripheral portion of the single cell element 54 so as to interrupt the air flow passage 49 and the fuel flow passage 47, a plate-shaped fuel electrode frame 60 arranged on the fuel electrode layer 52 side and a gas seal 61 arranged on the fuel electrode layer 52 side. These components are stacked and integrated into one unit.

In each fuel cell 13, a fuel-electrode-side collector 62 is disposed between the fuel electrode layer 52 and the interconnector 57b; and an air-electrode-side collector 63 is integrally formed on a surface (bottom side of FIG. 6) of the interconnector 57a.

The bolt insertion holes 27 are, when viewed in plan, formed in rectangular frame-shaped outer peripheral portions of the fuel cells 13 for insertion of the respective bolts 29.

As a material of the solid electrolyte layer 51, there can be used, for example, YSZ, ScSZ, SDC, GDC or perovskite oxide. There can be used, for example, Ni or cermet of Ni and ceramic material as a material of the fuel electrolyte layer 52. There can be used, for example, perovskite oxide as a material of the air electrode layer 53.

Figure 7:
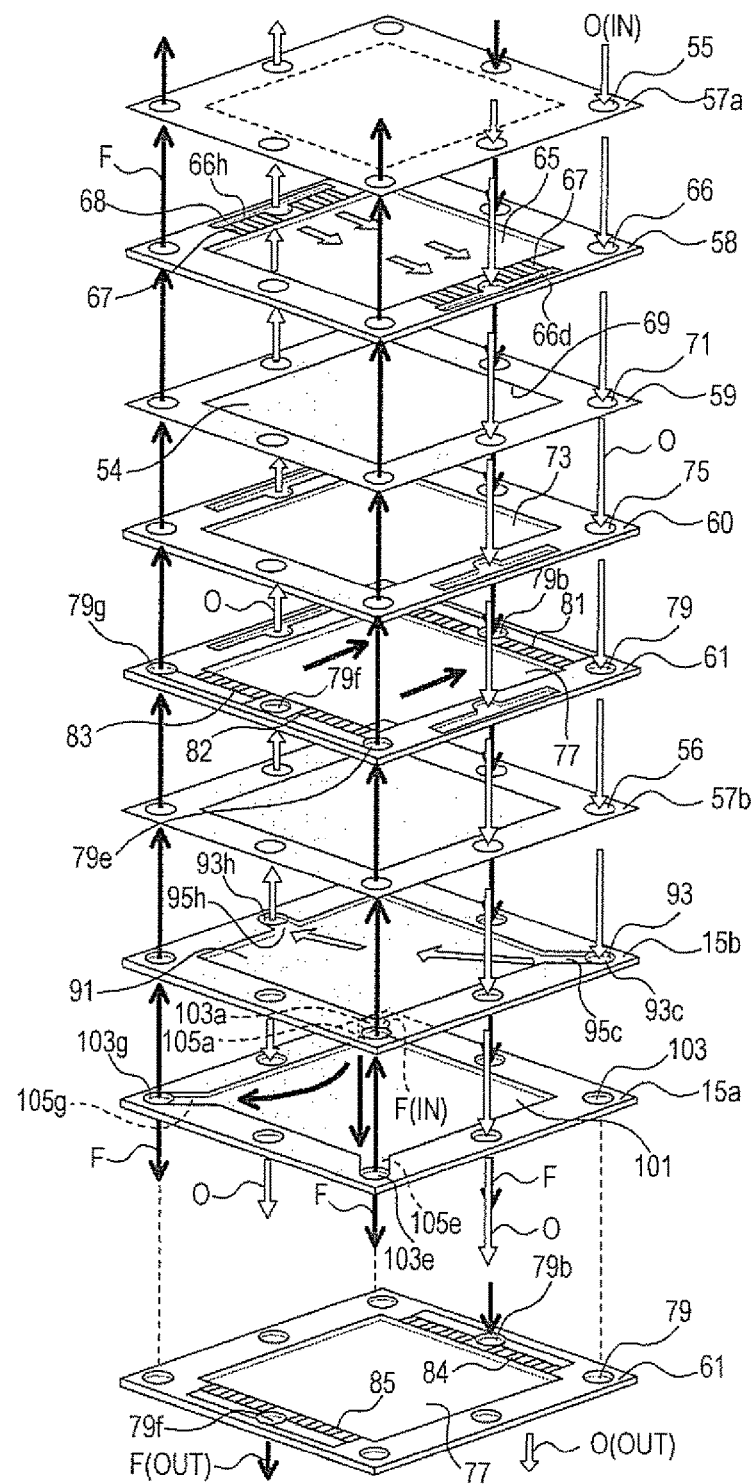
FIG. 7 is an exploded perspective view of a part of the fuel cell stack, schematically showing the flows of fuel gas and oxidant gas, according to the first embodiment of the present invention.

Each of the interconnectors 57a and 57b is made of e.g. ferrite stainless steel in a plate shape as shown in FIG. 7. Eight holes 55, 56 are formed in an outer peripheral portion of the interconnector 57a, 57b so as to correspond to the bolt insertion holes 27.

The gas seal 58 is made of e.g. mica or vermiculite in a frame-like plate shape with a square opening 65 in the center thereof. Eight holes 66 are formed in an outer peripheral portion of the gas seal 58 so as to correspond to the bolt insertion holes 27.

Among the holes 66, the fourth and eighth holes 66d and 66h are rectangular-shaped so as to extend along peripheral sides of the gas seal 58 and are in communication with the opening 65 through comb teeth-shaped communication grooves 67 and 68. Each of the communication grooves 67 and 68 is not only cut through the gas seal 58 in a thickness direction thereof but also recessed in one surface of the gas seal 58. These communication grooves 67 and 68 can be formed by laser or press working.

The separator 59 is made of e.g. ferrite stainless steel in a frame-like plate shape with a square opening 69 in the center thereof. The single cell element 54 is joined to the separator 59 so as to close the opening 69. Eight holes 71 are formed in an outer peripheral portion of the separator 59 so as to correspond to the bolt insertion holes 27.

The fuel electrode frame 60 is made of e.g. ferrite stainless steel in a frame-like plate shape with a square opening 73 in the center thereof. Eight holes 75 are formed in an outer peripheral portion of the fuel electrode frame 60 so as to correspond to the bolt insertion holes 27.

The gas seal 61 is made of e.g. mica or vermiculite in a frame-like plate shape with a square opening 77 in the center thereof. Eight holes 79 are also formed in an outer peripheral portion of the gas seal 61 so as to correspond to the bolt insertion holes 27.

Among the holes 79, the second and fifth holes 79b and 79e are in communication with the opening 77 through communication grooves 81 and 82; and the seventh hole 79g is in communication with the opening 77 through a communication groove 83. The communication grooves 81 and 82 are formed so as to extend in a comb teeth shape along peripheral sides of the gas seal 61. The communication groove 83 is formed similar to the communication grooves 81 and 82. Each of the communication grooves 81 to 83 is not only cut through the gas seal 61 in a thickness direction thereof but also recessed in one surface of the gas seal 61. These communication grooves 81 to 83 can also be formed by laser or press working.

In the gas seal 61 of each of the fuel cells 13A, 13B, 13C, 13D and 13D, the second, fifth and seventh holes 79b, 79e and 79g are in communication with the opening 77 through the respective communication grooves 81, 82 and 83, respectively, as mentioned above.

In the gas seal 61 of each of the sixth to eighth fuel cells 13F to 13H, by contrast, the second and sixth holes 79b and 79f are in communication with the opening 77 through communication grooves 84 and 85 as shown in the bottom side of FIG. 7. The communication grooves 84 and 85 are formed so as to extend in a comb teeth shape along peripheral sides of the gas seal 61.

d) The configurations of the fuel gas heat exchange part 15a and oxidant gas heat exchange part 15b will be explained below.

Figure 8:
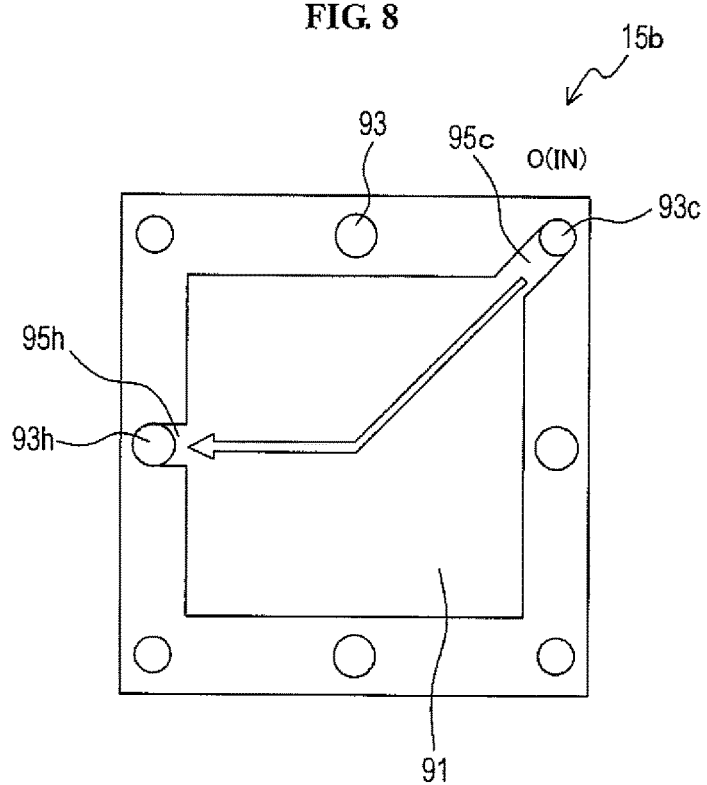
FIG. 8 is a plan view of an oxidant gas heat exchange part of the fuel cell stack according to the first embodiment of the present invention.

As shown in FIGS. 7 and 8, the oxidant gas heat exchange part 15b is plate-shaped and arranged adjacent to the fuel cell 13D. A square recess portion 91 is formed in the center of a fuel cell 13D side surface of the oxidant gas heat exchange part 15 b.

Eight holes 93 are formed in an outer peripheral portion of the oxidant gas heat exchange part 15b so as to correspond to the bolt insertion holes 27. Among the holes 93, the third and eighth holes 93c and 93h are in communication with the recess portion 91 through respective communication grooves 95c and 95h.

Each of the recess portion 91 and the communication grooves 95c and 95h is not cut through the oxidant gas heat exchange part 15b in a thickness direction thereof and is merely recessed in the fuel cell 13D side surface of the oxidant gas heat exchange part 15 b.

Figure 9:
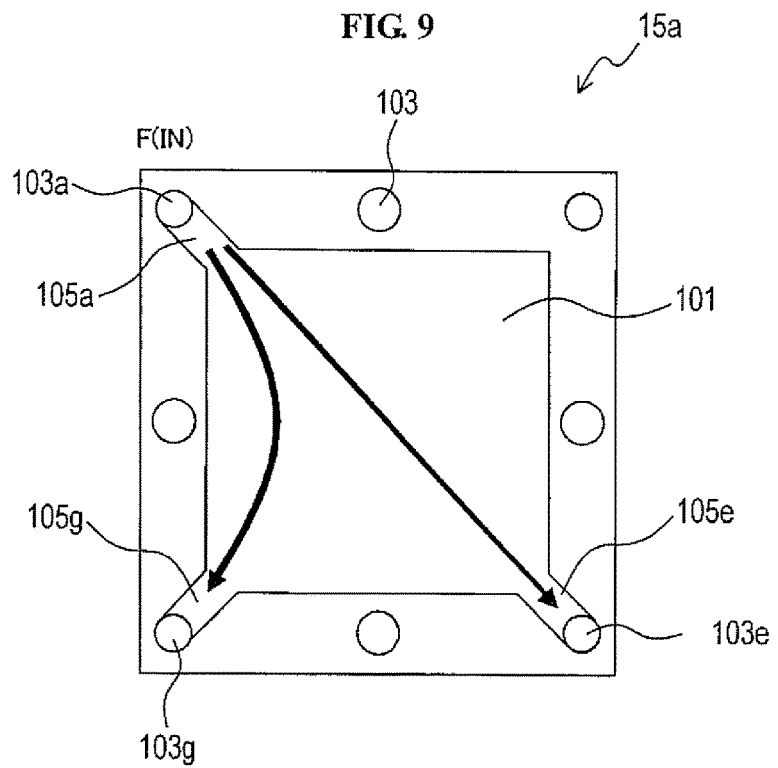
FIG. 9 is a plan view of a fuel gas heat exchange part of the fuel cell stack according to the first embodiment of the present invention.

As shown in FIGS. 7 and 9, the fuel gas heat exchange part 15a is plate-shaped and brought into contact at one surface thereof with the oxidant gas heat exchange part 15b and at the other surface thereof with the fuel cell 13E. A square recess portion 101 is formed in the center of the oxidant gas heat exchange part 15b side surface of the fuel gas heat exchange part 15a.

Eight holes 103 are formed in an outer peripheral portion of the fuel gas heat exchange part 15a so as to correspond to the bolt insertion holes 27. Among the holes 103, the first, fifth and seventh holes 103a, 103e and 103g are in communication with the recess portion 101 through respective communication grooves 105a, 105e and 105g.

Each of the recess portion 101 and the communication grooves 105a, 105e and 105g is not cut through the fuel gas heat exchange part 15a in a thickness direction thereof and is merely recessed in the one surface of the fuel gas heat exchange part 15a.

The above-configured fuel cell stack 3 is manufactured by stacking the structural components of the respective fuel cells 13, the fuel gas heat exchange part 15a and the oxidant gas heat exchange part 15b, inserting the bolts 29 through the respective bolt insertion holes 27 and tightening the nuts 31 on the respective bolts 29.

e) Next, the flow paths of the fuel gas and the oxidant gas will be explained below in detail.

<Fuel Gas Flow>

Figure 10:
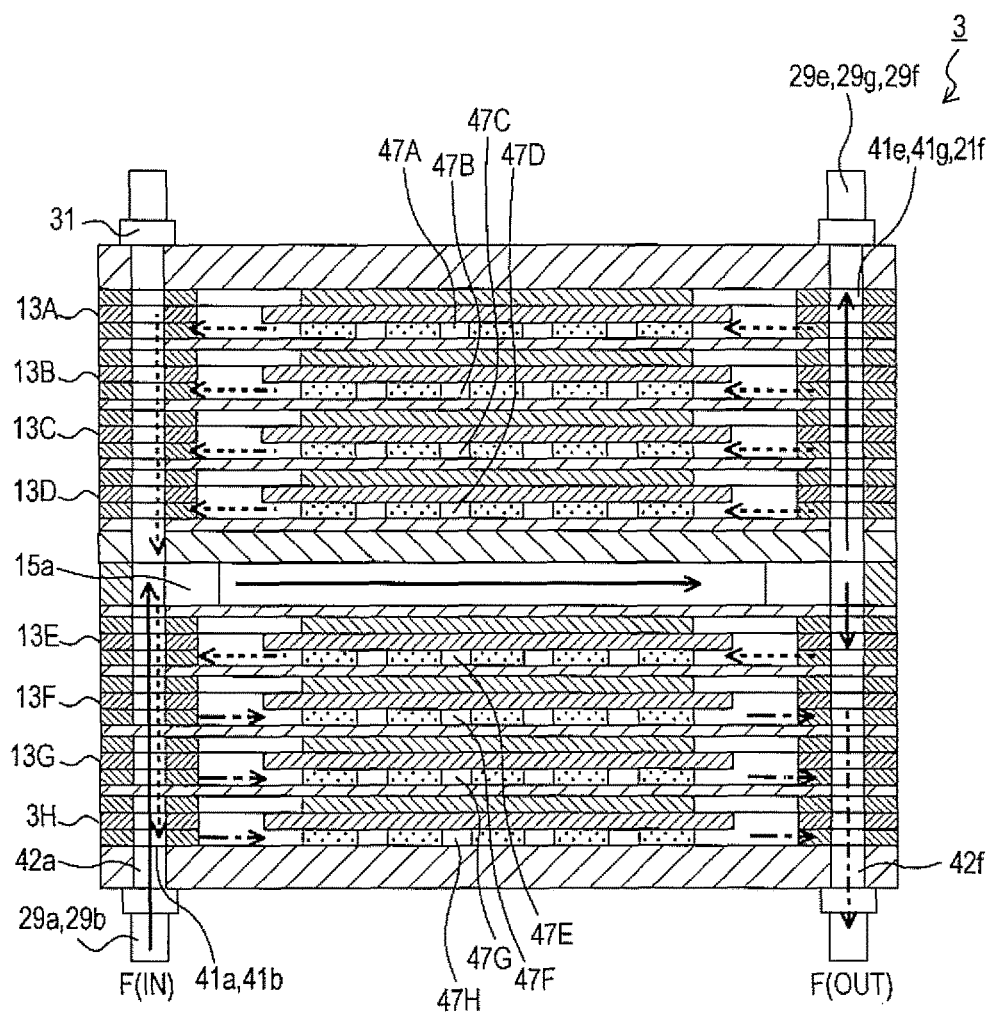
FIG. 10 is a section view of the fuel cell stack taken in the stacking direction, schematically showing the flows of cold fuel gas, heat-exchanged fuel gas and hot fuel gas, according to the first embodiment of the present invention.
Figure 11:
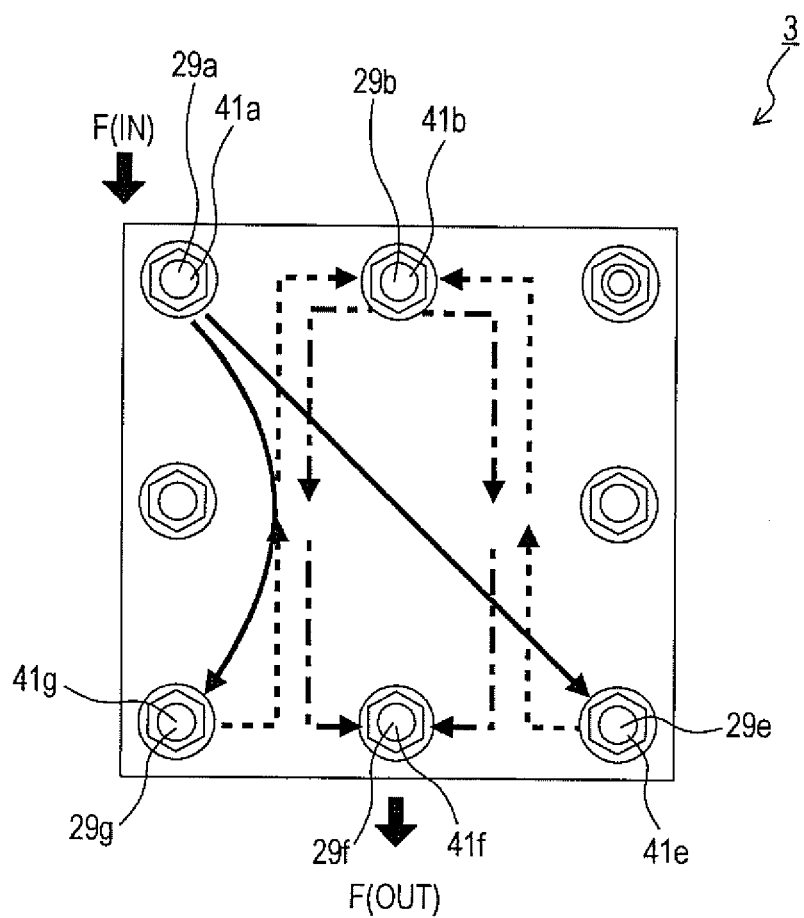
FIG. 11 is a plan view of the fuel cell stack, schematically showing the flows of cold fuel gas, heat-exchanged fuel gas and hot fuel gas in a plane direction of the fuel cells, according to the first embodiment of the present invention.

The flow path of the fuel gas is shown in FIGS. 4, 10 and 11. In FIGS. 10 and 11, the flow of cold gas (i.e. fuel gas supplied from the outside) is indicated by solid-line arrows; the flow of heat-exchanged gas (i.e. fuel gas raised in temperature by heat exchange) is indicated by broken-line arrows; and the flow of hot gas (i.e. fuel gas raised to higher temperature by power generation reaction) is indicated by dashed-line arrows.

First, the fuel gas (cold gas) of lower temperature (e.g. about 400° C.) than the inside temperature of the fuel cell stack 3 is introduced into the inner gas flow passage 41*a* from the outside of the fuel cell stack 3 through the opening 42*a* of the first bolt 29*a* at the lower side of the fuel cell stack 3 as shown in FIG. 4.

As shown in FIGS. 10 and 11, the fuel gas is then fed from the inner gas flow passage 41*a* into the fuel gas heat exchange part 15*a* and heated (preheated) by heat exchange with the adjacent structural component (e.g. fifth fuel cell 13E). By such heating, the cold fuel gas is heat-exchanged and raised to higher temperature (e.g. about 600° C.) than that introduced from the outside.

The resulting heat-exchanged fuel gas is fed from the fuel gas heat exchange part 15*a* into the inner gas flow passages 41*e* and 41*g* of the fifth and seventh bolts 29*e* and 29*g*, and then, fed from the inner gas flow passages 41*e* and 41*g* of the fifth and seventh bolts 29*e* and 29*g* into the fuel gas flow passages 47A to 47E of the first to fifth fuel cells 13A to 13E, i.e., into the first and second end blocks 21 and 23 (see FIG. 2B).

Subsequently, the fuel gas is discharged from the fuel gas flow passages 47A to 47E of the first to fifth fuel cells 13A to 13E into the inner gas flow passage 41*b* of the second bolt 29*b*. In the fuel cells 13A to 13E, the heat-exchanged fuel gas is further raised in temperature by power generation reaction and thereby changed to hot gas of higher temperature (e.g. about 700° C.) than that during the heat exchange.

The resulting hot fuel gas is fed from the inner gas flow passage 41*b* of the second bolt 29*b* into the fuel flow passages 47F to 47H of the sixth to eighth fuel cells 13F to 13H, i.e., into the third end block 25 (see FIG. 2B).

The hot fuel gas is discharged from fuel flow passages 47F to 47H of the sixth to eighth fuel cells 13F to 13H into the inner gas flow passage 41*f* of the sixth bolt 29*f*. As shown in FIG. 4, the fuel gas is finally discharged to the outside from the inner gas flow passage 41*f* of the sixth bolt 29*f* through the opening 42*f* at the lower side of the fuel cell stack 3.

<Oxidant Gas Flow>

Figure 12:
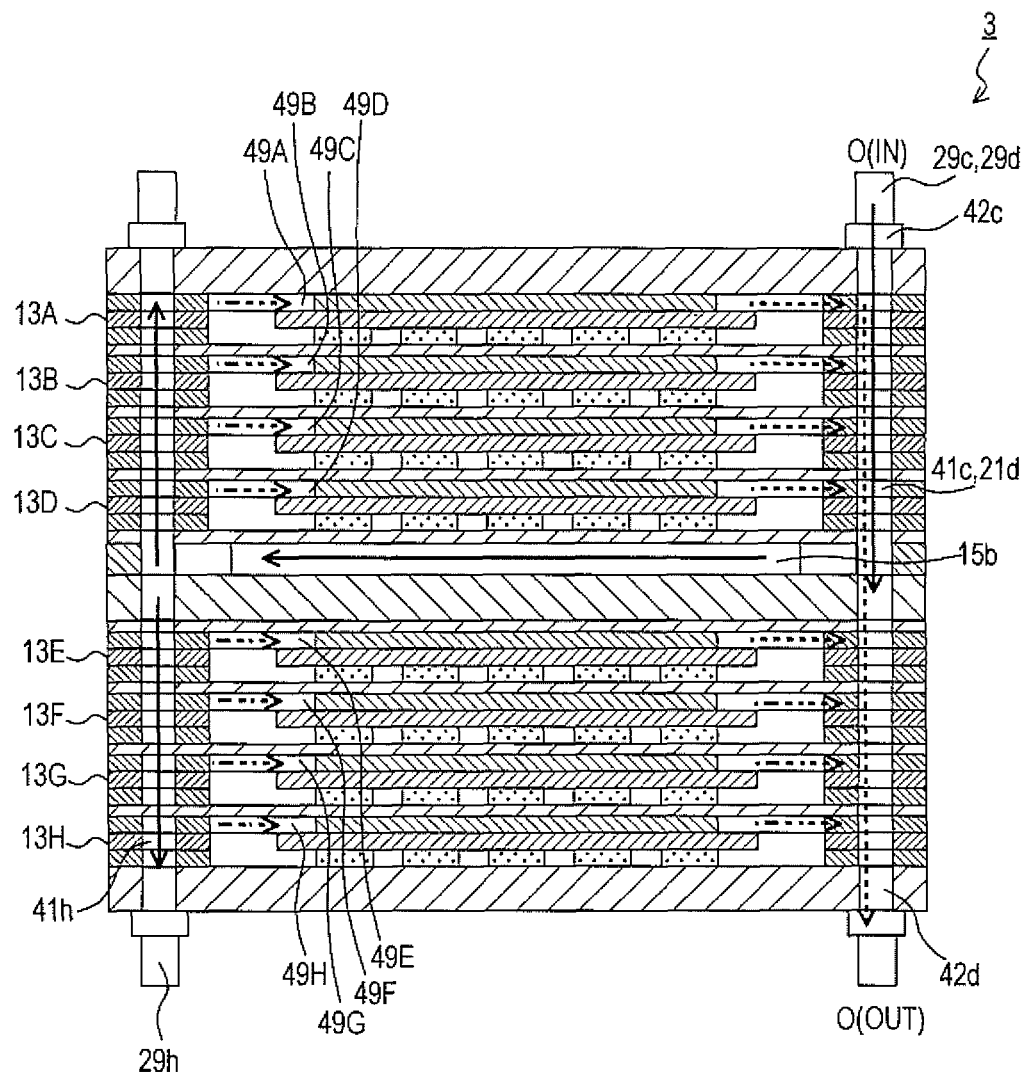
FIG. 12 is a section view of the fuel cell stack taken in the stacking direction, schematically showing the flows of cold oxidant gas, heat-exchanged oxidant gas and hot oxidant gas, according to the first embodiment of the present invention.
Figure 13:
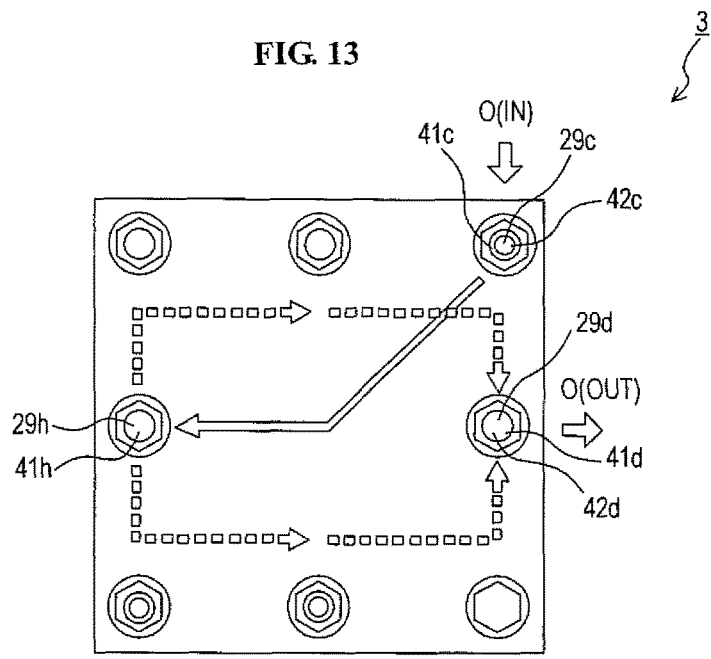
FIG. 13 is a plan view of the fuel cell stack, schematically showing the flows of cold oxidant gas, heat-exchanged oxidant gas and hot oxidant gas in the plane direction, according to the first embodiment of the present invention.

The flow path of the oxidant gas is shown in FIGS. 12 and 13. In FIGS. 12 and 13, the flow of cold gas (i.e. oxidant gas supplied from the outside) is indicated by solid-line arrows; the flow of heat-exchanged gas (i.e. oxidant gas raised in temperature by heat exchanged) is indicated by broken-line arrows; and the flow of hot gas (i.e. oxidant gas raised to higher temperature by power generation reaction) is indicated by dashed-line arrows.

The oxidant gas (cold gas) of lower temperature (e.g. about 400° C.) than the inside temperature of the fuel cell stack 3 is first introduced into the inner gas flow passage 41*c* from the outside of the fuel cell stack 3 through the opening 42*c* of the third bolt 29*c* at the upper side of the fuel cell stack 3 as shown in FIG. 5.

As shown in FIGS. 12 and 13, the oxidant gas is then fed from the inner gas flow passage 41*c* into the oxidant gas heat exchange part 15*b* and heated (preheated) by heat exchange with the adjacent component part (e.g. fourth fuel cell 13D). By such heating, the cold oxidant gas is heat exchanged and raised to higher temperature (e.g. about 500° C.) than that introduced from the outside.

The resulting heat-exchanged oxidant gas is fed from the oxidant gas heat exchange part 15*b* into the inner gas flow passage 41*h* of the eighth bolt 29*h*, and then, fed from the inner gas flow passage 41*h* of the eighth bolt 29*h* into the air flow passages 49A to 49H of the first to eighth fuel cells 13A to 13H.

Subsequently, the oxidant gas is fed from the air flow passages 49A to 49H of the first to eighth fuel cells 13A to 13H into the inner gas flow passage 41*d* of the fourth bolt 29*d*. In the fuel cells 13A to 13H, the heat-exchanged oxidant gas is further raised in temperature by power generation reaction and thereby changed to hot gas of higher temperature (e.g. about 600° C.) than that during the heat exchange.

The resulting hot oxidant gas is discharged to the outside from the inner gas flow passage 41*d* of the fourth bolt 29*d* through the opening 42*d* at the lower side of the fuel cell stack 3 as shown in FIG. 5.

f) The plane direction temperature distribution caused by the flows of the fuel gas and the oxidant gas will be explained below in detail.

By the above flows of the fuel gas and the oxidant gas, there occurs a temperature distribution in the fuel cell stack 3 in a plane direction thereof (i.e., direction of extension of the fuel cells 13; direction perpendicular to the stacking direction).

More specifically, the fuel cell stack 3, when viewed in the stacking direction (i.e. vertical direction in FIGS. 10 and 12), causes a temperature distribution in the plane direction by the flow passages of the fuel gas and the oxidant gas in the stacking direction.

Figure 14A:
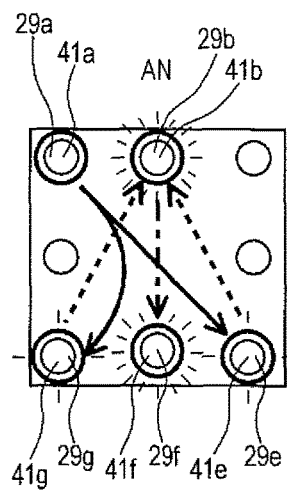
FIG. 14A is a plan view of the fuel cell stack, schematically showing the temperature states of fuel gas manifolds, according to the first embodiment of the present invention.

The fuel-gas-side temperature distribution (AN) is shown in FIG. 14A.

The surrounding temperature of the first inner gas flow passage 41*a* of the first bolt 29*a* into which the cold fuel gas flows from the outside is low. The surrounding temperature of the fifth and seventh inner gas flow passages 41*e* and 41*g* of the fifth and seventh bolts 29*e* and 29*g* in which the fuel gas after subjected to heat exchange (i.e. heat-exchanged fuel gas) flows is higher than the surrounding temperature of the first inner gas flow passage 41*a* of the first bolt 29*a* in which the cold fuel gas flows.

The surrounding temperature of the second inner gas flow passage 41*b* of the second bolt 29*b* in which the fuel gas after heated by power generation reaction (i.e. hot fuel gas) flows is higher than the surrounding temperature of the fifth and seventh inner gas flow passages 41*e* and 41*g* of the fifth and seventh bolts 29*e* and 29*g* in which the heat-exchanged fuel gas flows.

The surrounding temperature of the sixth inner gas flow passage 41*f* of the sixth bolt 29*f* in which the fuel gas after again heated by power generation reaction (i.e. hotter fuel gas) flows is the highest.

Figure 14B:
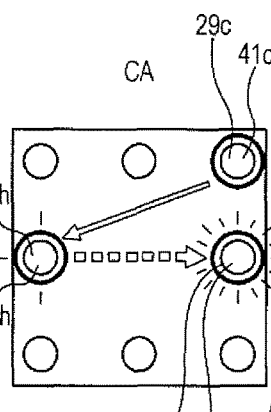
FIG. 14B is a plan view of the fuel cell stack, schematically showing the temperature states of oxidant gas manifolds, according to the first embodiment of the present invention.

Similarly, the oxidant-gas-side temperature distribution (CA) is shown in FIG. 14B.

The surrounding temperature of the third inner gas flow passage 41*c* of the third bolt 29*c* into which the cold oxidant gas flows from the outside is low. The surrounding temperature of the eighth inner gas flow passage 41*h* of the eighth bolt 29*h* in which the oxidant gas after subjected to heat exchange (i.e. heat-exchanged oxidant gas) flows is higher than the surrounding temperature of the third inner gas flow passage 41*c* of the third bolt 29*c* in which the cold oxidant gas flows.

The surrounding temperature of the fourth inner gas flow passage 41*d* of the fourth bolt 29*d* in which the oxidant gas after heated by power generation reaction (i.e. hot oxidant gas) flows is higher than the surrounding temperature of the eighth inner gas flow passage 41*h* of the eighth bolt 29*h* in which the heat-exchanged oxidant gas flows.

Figure 14C:
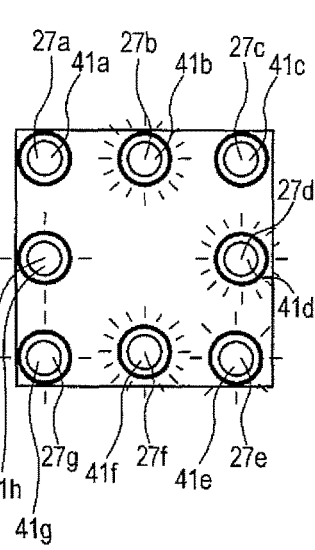
FIG. 14C is a plan view of the fuel cell stack, schematically showing both of the temperature states of the fuel gas manifolds and oxidant gas manifolds, according to the first embodiment of the present invention.

In summary, the surrounding temperature of the first and third inner gas flow passages 41a and 41c (i.e. bolt insertion holes 27a and 27c) in which the cold gas flows is the lowest; the surrounding temperature of the fifth, seventh and eighth inner gas flow passages 41e, 41g and 41h (i.e. bolt insertion holes 27e, 27g and 27h) in which the heat-exchanged gas flows is higher than the surrounding temperature of the first and third inner gas flow passages 41a and 41c; and the surrounding temperature of the second, fourth and sixth inner gas flow passages 41b, 41d and 41f (i.e. bolt insertion holes 27b, 27d and 27f) in which the hot gas flows is the highest as shown in FIG. 14C.

g) The effects of the first embodiment will be explained below.

In the first embodiment, the inner gas flow passages 41a to 41h (also referred to as "manifolds") are provided for the flows of the fuel gas and the oxidant gas in the stacking direction. Among these manifolds, the cold gas manifolds 41a and 41c are each adapted to introduce the fuel gas or oxidant gas into the fuel cell stack 3 from the outside; and the hot gas manifolds 41b, 41d and 41f are each adapted to discharge the fuel gas or oxidant gas from the fuel cells 13A to 13H.

When the fuel cell stack 3 is viewed in the stacking direction (i.e. viewed in plan), the manifolds 41a to 41h are arranged such that every one of the cold gas manifolds 41a and 41c is adjacent to any of the hot gas manifolds 41b, 41d and 41f and such that one of the hot gas manifolds 41b, 41d and 41f is not adjacent to any other one of the hot gas manifolds 41b, 41d and 41f.

Namely, all of the manifolds 41a and 41c though each of which the cold gas of low temperature flows are adjacent to the manifolds 41b, 41d and 41f through each of which the hot gas of higher temperature than the cold gas flows. Further, each of the high-temperature hot gas manifolds 41b, 41d and 41f is not adjacent to any other one of the high-temperature hot gas manifolds 41b, 41d and 41f, that is, the high-temperature hot gas manifolds 41b, 41d and 41f are not located adjacent to each other. This manifold arrangement enables decrease of temperature difference in the plane direction of the fuel cells 13 so as to secure a uniform temperature of the fuel cells 13 in the plane direction.

It is therefore possible to reduce the in-plane temperature distribution of the fuel cells 13 for reduction of cell in-plane resistance distribution and cell in-plane current and voltage distribution. In consequence, the fuel cell stack is able to obtain significant effects of stable high power output by prevention of cell in-plane current flow.

As the hot gas manifolds 41b, 41d and 41f are not adjacent to each other, the in-plane temperature distribution of the fuel cells 13 is effectively reduced to reduce the tendency for excessively high temperature regions to occur in the fuel cells 13. It is thus advantageously possible to suppress deterioration of metal members in the fuel cell stack.

Further, the heat-exchanged gas manifolds 41e, 41g and 41h are each adapted to feed the fuel gas or oxidant gas that has been subjected to heat exchange within the fuel cell stack 3 in the first embodiment. When the fuel cell stack 3 is viewed in plan, at least either of the heat-exchanged gas manifolds 41e, 41g and 41h and the cold gas manifolds 41a and 41c is adjacent to the hot gas manifold 41b, 41d, 41f.

Namely, the highest-temperature hot gas manifold 41b, 41d, 41f is adjacent to at least either the lower-temperature heat-exchanged gas manifold 41e, 41g, 41h or the low-temperature cold gas manifold 41a, 41c. It is thus possible to effectively uniformize the temperature of the fuel cells 13 in the plane direction.

In the first embodiment, the respective manifolds 41a to 41h are, when viewed in plan, arranged in a queue, even though the queue is bent in shape, such that least any of the heat-exchanged gas manifolds 41e, 41g and 41h and the cold gas manifolds 41a and 41c are adjacent to both sides of the hot gas manifold 41b, 41d, 41f. It is thus possible to more uniformize the temperature of the fuel cells 13 in the plane direction.

Furthermore, the respective manifolds 41a to 41h are, when viewed in plan, arranged in a queue such that the hot-gas manifolds 41b and 41d are adjacent to both sides of the cold-gas manifold 41c though which the largest amount of cold oxidant gas flows is adjacent to.

It is thus possible to effectively maintain the surrounding temperature of the cold gas manifold and more uniformize the temperature of the fuel cells in the plane direction.

In addition, the cold gas manifold 41c through which the largest amount of cold oxidant gas flows is adjacent to the hot gas manifold 41d through which the hot oxidant gas of the highest temperature flows in the first embodiment. It is thus possible to effectively decrease the surrounding temperature of the hot oxidant gas manifold 41d and more uniformize the temperature of the fuel cells in the plane direction.

It is herein noted that the amount of the oxidant gas supplied is generally two to five times the amount of the fuel gas supplied.

[Second Embodiment]

The second embodiment of the present invention will be explained below. The same parts of the second embodiment as those of the first embodiment are designated by the same reference numerals; and explanations thereof will be omitted herefrom.

Differently from the fuel cell stack of the first embodiment, a fuel cell stack of the second embodiment is not provided with a fuel gas heat exchange part and is configured to introduce the fuel gas through two different manifolds and feed the fuel gas from these manifolds to respective fuel cells.

a) First, the configuration of the fuel cell stack of the second embodiment will be explained below.

Figure 15:
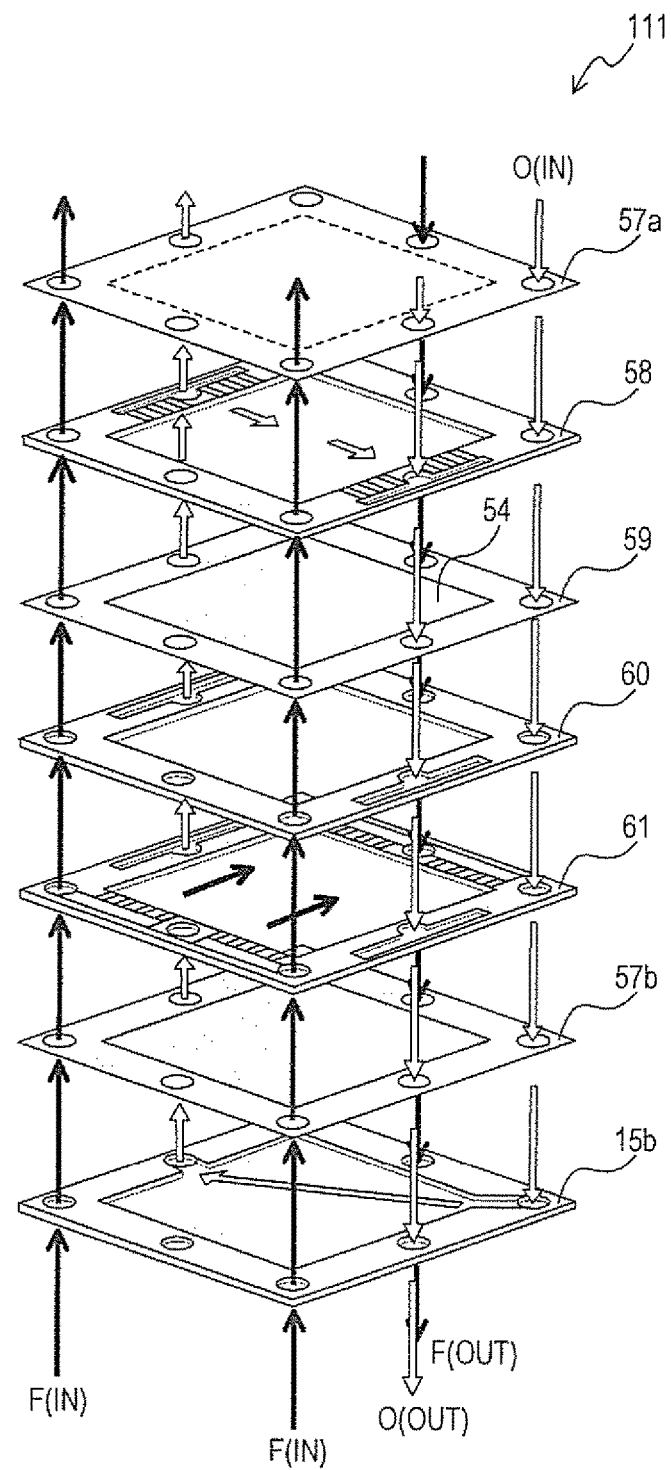
FIG. 15 is an exploded perspective view of a part of a fuel cell stack, schematically showing the flows of fuel gas and oxidant gas, according to a second embodiment of the present invention.

In the second embodiment, the fuel cell stack 111 has a plurality of fuel cells, each including an interconnector 57a, a gas seal 58, a separator 59 to which a single cell element 54 is joined, a fuel electrode frame 60, a gas seal 61 and an interconnector 57b, stacked together with an oxidant gas heat exchange part 15b as shown in FIG. 15 as in the case of the first embodiment.

Figure 16:
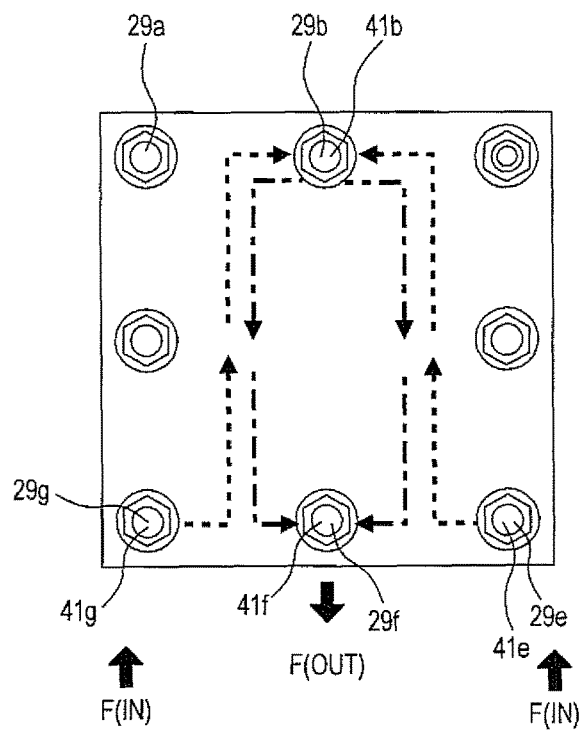
FIG. 16 is a plan view of the fuel cell stack, schematically showing the flow of fuel gas in a plane direction of fuel cells, according to the second embodiment of the present invention.

As shown in FIGS. 15 and 16, the fuel gas is introduced as cold gas from the outside into the fifth and seventh inner gas flow passages 41e and 41g of the fifth and seventh bolts 29e and 29g, and then, fed from the fifth and seventh inner gas flow passages 41e and 41g of the fifth and seventh bolts 29e and 29g into the first to fifth fuel cells 13A to 13E.

Subsequently, the fuel gas is fed as hot gas from the first to fifth fuel cells 13A to 13E into the second inner gas flow passage 41b of the second bolt 29b, fed from the second inner gas flow passage 41b of the second bolt 29b into the sixth to eighth fuel cells 13F to 13H, and then, discharged to the outside.

The first bolt 29a is not used as a gas flow passage in the second embodiment.

As the flow of the oxidant gas is the same as that of the first embodiment, explanation of the oxidant gas flow will be omitted herefrom.

b) Next, the plane direction temperature distribution caused by the flows of the fuel gas and the oxidant gas will be explained below in detail.

When the fuel cell stack 111 is viewed in the stacking direction (i.e. vertical direction in FIG. 15), there occurs a temperature distribution in the fuel cell stack 111 in a plane direction thereof by the above flows (manifolds) of the fuel gas and the oxidant gas in the stacking direction in the second embodiment.

Figure 17A:
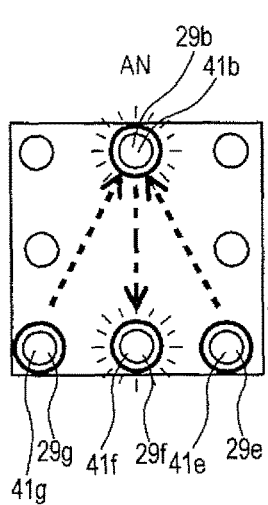
FIG. 17A is a plan view of the fuel cell stack, schematically showing the temperature states of fuel gas manifolds, according to the second embodiment of the present invention.

The fuel-gas-side temperature distribution (AN) is shown in FIG. 17A.

The surrounding temperature of the fifth and seventh inner gas flow passages 41e and 41g of the fifth and seventh bolts 29e and 29g into which the cold fuel gas flows from the outside is low.

The surrounding temperature of the second inner gas flow passage 41b of the second bolt 29b in which the fuel gas after heated by power generation reaction (i.e. hot fuel gas) flows is higher than the surrounding temperature of the fifth and seventh inner gas flow passages 41e and 41g of the fifth and seventh bolts 29e and 29g in which the cold fuel gas flows.

The surrounding temperature of the sixth inner gas flow passage 41f of the sixth bolt 29f in which the fuel gas after again heated by power generation reaction (i.e. hotter fuel gas) flows is the highest.

Figure 17B:
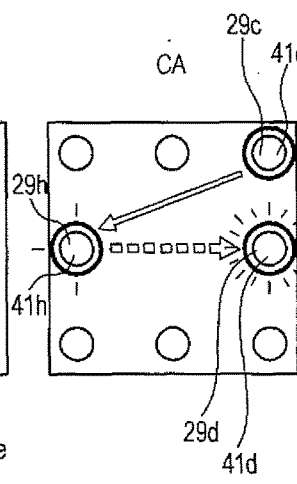
FIG. 17B is a plan view of the fuel cell stack, schematically showing the temperature states of oxidant gas manifolds, according to the second embodiment of the present invention.

As shown in FIG. 17B, the oxidant-gas-side temperature distribution (CA) is the same as that of the first embodiment. The surrounding temperature of the third inner gas flow passage 41c of the third bolt 29c into which the cold oxidant gas flows from the outside is low. The surrounding temperature of the eighth inner gas flow passage 41h of the eighth bolt 29h in which the heat-exchanged oxidant gas flows is higher than the surrounding temperature of the third inner gas flow passage 41c of the third bolt 29c in which the cold oxidant gas flows. The surrounding temperature of the fourth inner gas flow passage 41d of the fourth bolt 29d in which the hot oxidant gas flows is the highest.

Figure 17C:
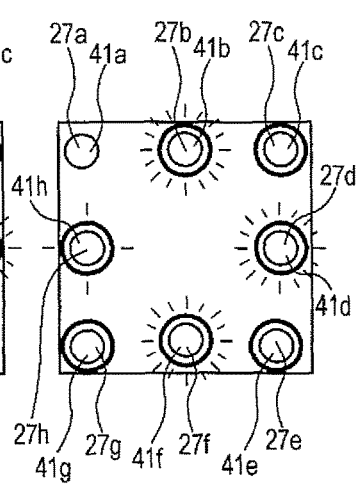
FIG. 17C is a plan view of the fuel cell stack, schematically showing both of the temperature states of the fuel gas manifolds and oxidant gas manifolds, according to the second embodiment of the present invention.

In summary, the surrounding temperature of the third, fifth and seventh inner gas flow passages 41c, 41e and 41g (i.e. third, fifth and seventh bolt insertion holes 27c, 27e and 27g) in which the cold gas flows is the lowest; the surrounding temperature of the eighth inner gas flow passage 41h (i.e. eighth bolt insertion hole 27h) in which the heat-exchanged gas flows is higher than the surrounding temperature of the third, fifth and seventh inner gas flow passages 41c, 41e and 41g; and the surrounding temperature of the second, fourth and sixth inner gas flow passages 41b, 41d and 41f (i.e. bolt insertion holes 27b, 27d and 27f) in which the hot gas flows is the highest as shown in FIG. 17C.

The inside temperature and surrounding temperature of the first bolt insertion hole 27a, which is not used as the gas flow passage, is substantially the same as that of the structural components around the first bolt insertion hole 27a.

By the above configuration of the second embodiment, it is possible to obtain the same effects as those of the first embodiment. It is also possible to simplify the gas flow path configuration etc. since the fuel gas heat exchange part is not used in the second embodiment.

[Third Embodiment]

The third embodiment of the present invention will be explained below. The same parts of the third embodiment as those of the first and second embodiments are designated by the same reference numerals; and explanations thereof will be omitted herefrom.

A fuel cell stack of the third embodiment is basically the same in configuration as the fuel cell stack of the second embodiment, except that the fuel cell stack is configured to introduce the fuel gas thereto through one manifold in the third embodiment.

a) First, the configuration of the fuel cell stack of the third embodiment will be explained below.

Figure 18:
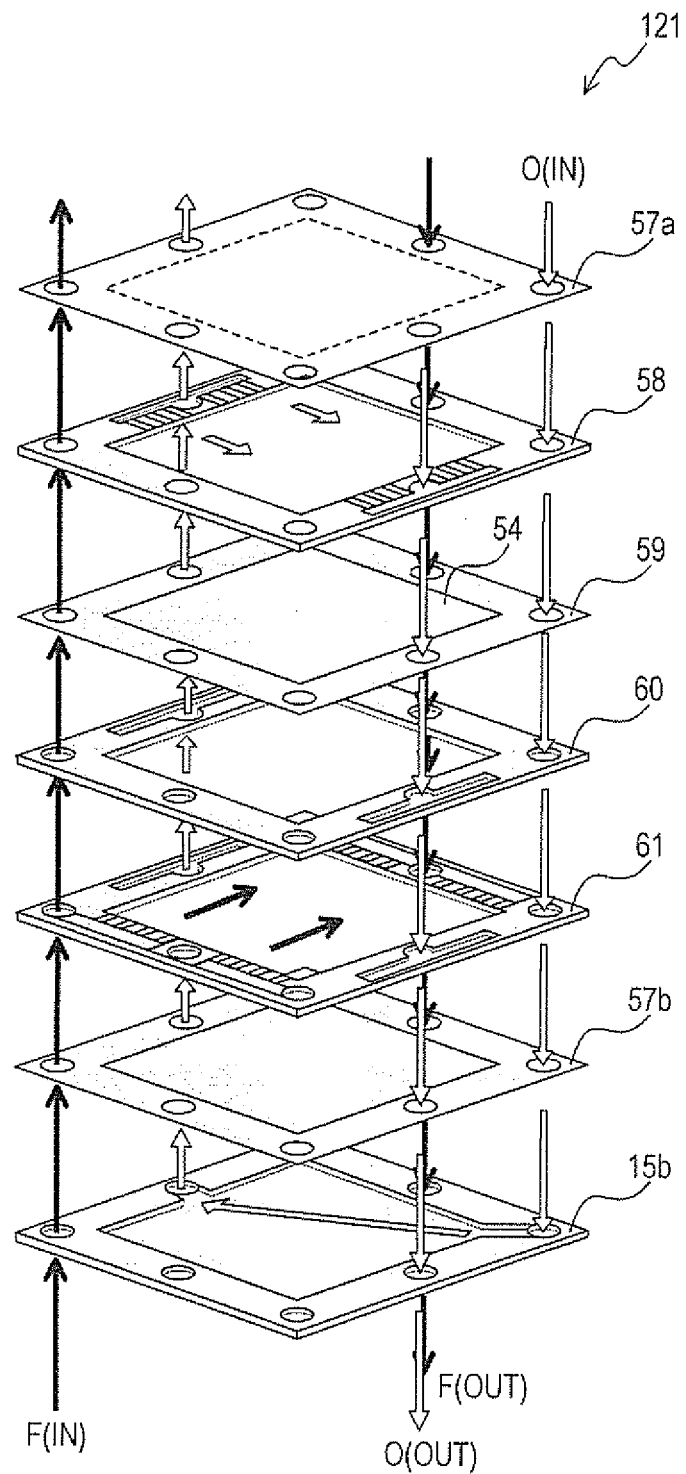
FIG. 18 is an exploded perspective view of a part of a fuel cell stack, schematically showing the flows of fuel gas and oxidant gas, according to a third embodiment of the present invention.

In the third embodiment, the fuel cell stack 121 has a plurality of fuel cells, each including an interconnector 57a, a gas seal 58, a separator 59 to which a single cell element 54 is joined, a fuel electrode frame 60, a gas seal 61 and an interconnector 57b, stacked together with an oxidant gas heat exchange part 15b as shown in FIG. 18 as in the case of the first embodiment.

Figure 19:
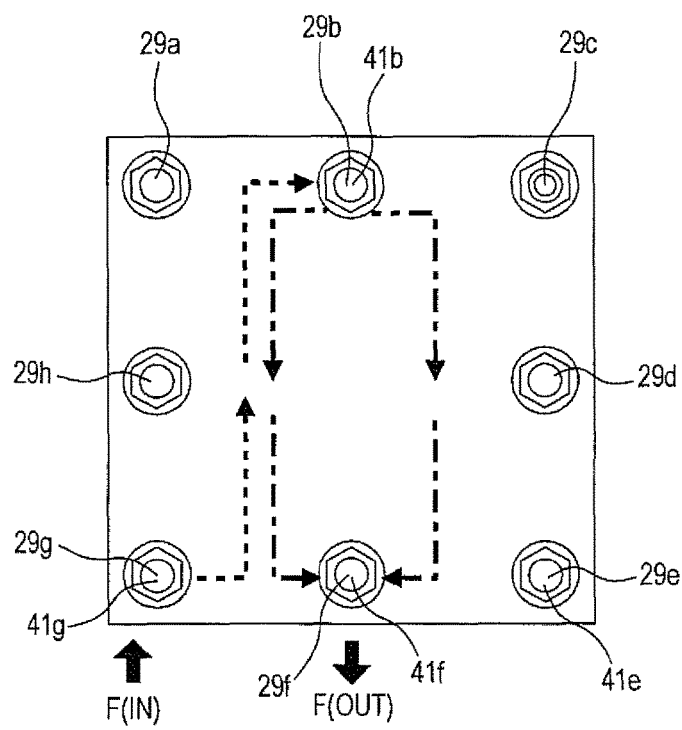
FIG. 19 is a plan view of the fuel cell stack, schematically showing the flow of fuel gas in a plane direction of fuel cells, according to the third embodiment of the present invention.

As shown in FIGS. 18 and 19, the fuel gas is introduced as cold gas from the outside into only the seventh inner gas flow passage 41g of the seventh bolt 29g. The fuel gas may alternatively be introduced into only the fifth inner gas flow passage 41e of the fifth bolt 29e.

Then, the fuel gas is fed from the seventh inner gas flow passage 41g of the seventh bolt 29g into the first to fifth fuel cells 13A to 13E and fed from the first to fifth fuel cells 13A to 13E into the second inner gas flow passage 41b of the second bolt 29b.

The fuel gas is subsequently fed from the second inner gas flow passage 41b of the second bolt 29b into the sixth to eighth fuel cells 13F to 13H, and then, discharged to the outside.

The first and fifth bolts 29a and 29e are not used as gas flow passages in the third embodiment.

As the flow of the oxidant gas is the same as that of the first embodiment, explanation of the oxidant gas flow will be omitted herefrom.

b) Next, the plane direction temperature distribution caused by the flows of the fuel gas and the oxidant gas will be explained below in detail.

When the fuel cell stack 121 is viewed in the stacking direction (i.e. vertical direction in FIG. 18), there occurs a temperature distribution in the fuel cell stack 121 in a plane direction thereof by the above flows (manifolds) of the fuel gas and the oxidant gas in the stacking direction in the third embodiment.

Figure 20A:
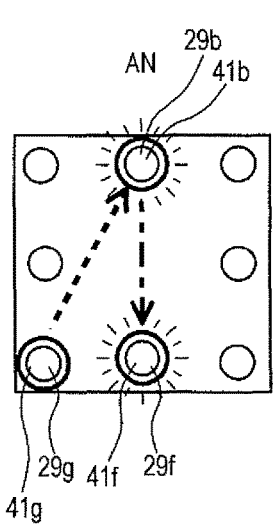
FIG. 20A is a plan view of the fuel cell stack, schematically showing the temperature states of fuel gas manifolds, according to the third embodiment of the present invention.

The fuel-gas-side temperature distribution (AN) is shown in FIG. 20A.

The surrounding temperature of the seventh inner gas flow passage 41 g of the seventh bolt 29e and 29g into which the cold fuel gas flows from the outside is low. The surrounding temperature of the second inner gas flow passage 41b of the second bolt 29b in which the fuel gas after heated by power generation reaction (i.e. hot fuel gas) flows is higher than the surrounding temperature of the seventh inner gas flow passage 41g of the seventh bolt 29e and 29g in which the cold fuel gas flows.

The surrounding temperature of the sixth inner gas flow passage 41f of the sixth bolt 29f in which the fuel gas after again heated by power generation reaction (i.e. hotter fuel gas) flows is the highest.

Figure 20B:
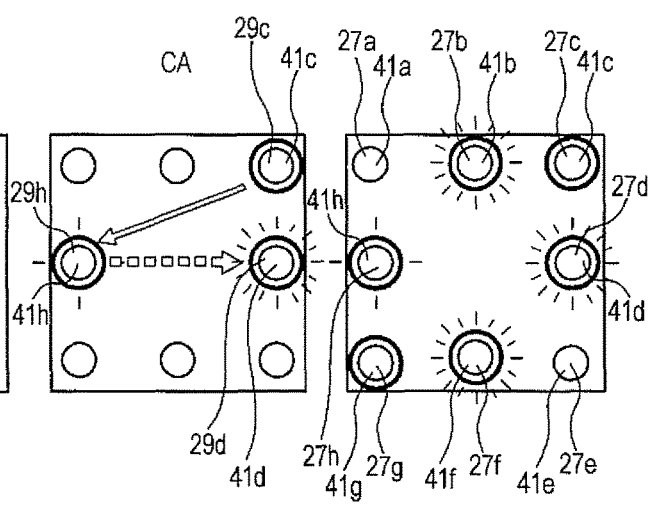
FIG. 20B is a plan view of the fuel cell stack, schematically showing the temperature states of oxidant gas manifolds, according to the third embodiment of the present invention.

As shown in FIG. 20B, the oxidant-gas-side temperature distribution (CA) is the same as that of the first embodiment. The surrounding temperature of the third inner gas flow passage 41c of the third bolt 29c into which the cold oxidant gas flows from the outside is low. The surrounding temperature of the eighth inner gas flow passage 41h of the eighth bolt 29h in which the heat-exchanged oxidant gas flows is higher than the surrounding temperature of the third inner gas flow passage 41c of the third bolt 29c in which the cold oxidant gas flows. The surrounding temperature of the fourth inner gas flow passage 41d of the fourth bolt 29d in which the hot oxidant gas flows is the highest.

Figure 20C:
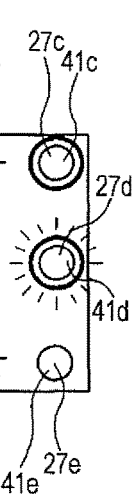
FIG. 20C is a plan view of the fuel cell stack, schematically showing both of the temperature states of the fuel gas manifolds and oxidant gas manifolds, according to the third embodiment of the present invention.

In summary, the surrounding temperature of the third and seventh inner gas flow passages 41c and 41g (i.e. third and seventh bolt insertion holes 27c and 27g) in which the cold gas flows is the lowest; the surrounding temperature of the eighth inner gas flow passage 41h (i.e. eighth bolt insertion hole 27h) in which the heat-exchanged gas flows is higher than the surrounding temperature of the third and seventh inner gas flow passages 41c and 41g; and the surrounding temperature of the second, fourth and sixth inner gas flow passages 41b, 41d and 41f (i.e. bolt insertion holes 27b, 27d and 27f) in which the hot gas flows is the highest as shown in FIG. 20C.

The inside temperature and surrounding temperature of the first and fifth bolt insertion holes 27a and 27e, which are not used the gas flow passages, is substantially the same as that of the structural components around the first and fifth bolt insertion holes 27a and 27e.

By the above configuration of the third embodiment, it is possible to not only obtain the same effects as those of the second embodiment but also more simplify the gas flow path configuration etc.

[Fourth Embodiment]

The fourth embodiment of the present invention will be explained below. The same parts of the fourth embodiment as those of the first embodiment are designated by the same reference numerals; and explanations thereof will be omitted herefrom.

A fuel cell stack of the fourth embodiment is basically the same in configuration as the fuel cell stack of the first embodiment, except that heat exchange parts are located outside the fuel cell stack in the fourth embodiment.

a) First, the configuration of the fuel cell stack of the fourth embodiment will be explained below.

Figure 21B:
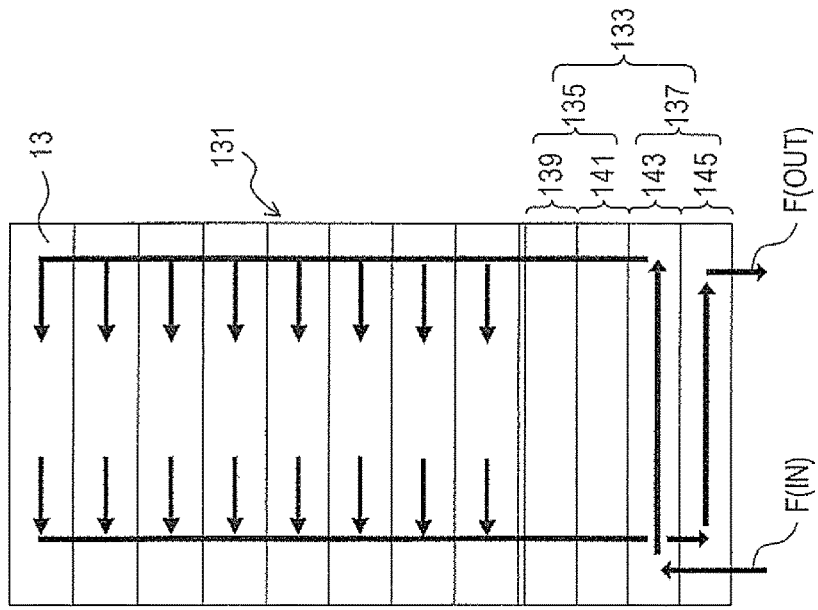
FIG. 21B is a section view of the fuel cell stack taken in the stacking direction, schematically showing a flow path of fuel gas, according to the fourth embodiment of the present invention.
Figure 21A:
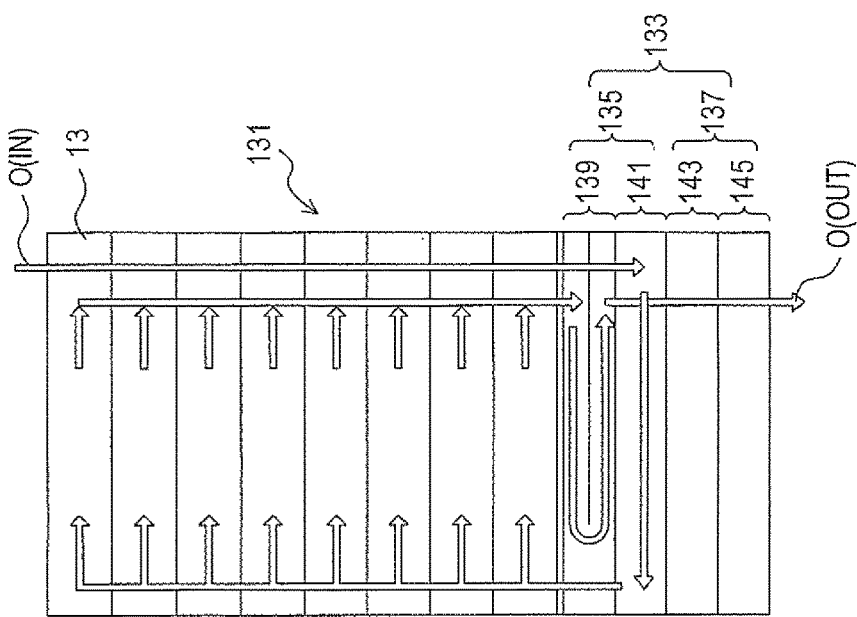
FIG. 21A is a section view of a fuel cell stack taken in a stacking direction thereof, schematically showing a flow path of oxidant gas, according to a fourth embodiment of the present invention.

As shown in FIGS. 21A and 21B, the heat exchange parts 133 are located on the lower side of the fuel battery stack 131. As the heat exchange parts 133, there are provided an oxidant gas heat exchange part 135 for heat exchange of the oxidant gas and a fuel gas heat exchange part 137 for heat exchange of the fuel gas.

The oxidant gas heat exchange part 135 has first and second oxidant gas rooms 139 and 141 arranged adjacent to each other. The cold oxidant gas introduced from the outside flows through the second oxidant gas room 141, whereas the oxidant gas after used for power generation (i.e. the oxidant gas higher in temperature than the above cold oxidant gas) flows through the first oxidant gas room 139.

The fuel gas heat exchange part 137 has first and second fuel gas rooms 143 and 145 arranged adjacent to each other. The cold fuel gas introduced from the outside flows through the first fuel gas room 143, whereas the fuel gas after used for power generation (i.e. the fuel gas higher in temperature than the above cold fuel gas) flows through the second fuel gas room 145.

b) Next, the flow of the gas in the fuel cell stack 131 will be explained below.

The arrangement of the oxidant and fuel gas manifolds as viewed in plan is the same as that of the first embodiment shown in FIGS. 14A to 14C.

<Oxidant Gas Flow Path>

As shown in FIG. 21A, the oxidant gas is introduced from the outside into the second oxidant gas room 141 through the fuel cell stack 131, fed into air flow passages (not shown) of the respective fuel cells 13 of the fuel cell stack 131 and, after used for power generation, discharged from the air flow passages of the respective fuel cells to the outside through the first oxidant gas room 139.

The oxidant gas heat exchange part allows heat exchange between the oxidant gas in the first oxidant gas room 139 and the oxidant gas in the second oxidant gas room 141. The temperature of the oxidant gas in the second oxidant gas room 141 is raised by such heat exchange reaction.

<Fuel Gas Flow Path>

As shown in FIG. 21B, the fuel gas is introduced from the outside into the first fuel gas room 143, fed into fuel gas flow passages (not shown) of the respective fuel cells 13 of the fuel cells stack 131 and, after used for power generation, discharged from the fuel gas flow passages of the respective fuel cells to the outside through the second fuel gas room 145.

The fuel gas heat exchange part allows heat exchange between the fuel gas in the first fuel gas room 143 and the fuel gas in the second fuel gas room 145. The temperature of the fuel gas in the first fuel gas room 143 is raised by such heat exchange reaction.

By the above configuration of the fourth embodiment, it is possible to obtain the same effects as those of the first embodiment. The temperature distribution between the respective manifolds as viewed in plan is the same as that of the first embodiment (see FIGS. 14A to 14C).

[Correspondence of Claims]

The claimed manifolds correspond to, for example, the inner gas flow passages for allowing the fuel gas and the oxidant gas to flow in the stacking direction in the first embodiment.

The present invention is not limited to the above embodiments. Various changes and modifications of the above embodiments are possible within the scope of the present invention.

(1) In each of the above embodiments, the fuel gas flow passages are provided in a serial flow structure (that allows the fuel gas to flow into some of the fuel cells and allows the fuel gas discharged from these some fuel cells to flow into the other fuel cells). The oxidant gas flow passages may also be provided in a serial flow structure (that allows the oxidant gas to flow into some of the fuel cells and allows the oxidant gas discharged from these some fuel cells to flow into the other fuel cells).

(2) Although both of the fuel gas heat exchange part and the oxidant gas heat exchange part are provided in the first embodiment, it is feasible to provide at least the oxidant gas heat exchange part and supply the fuel gas to the fuel cells through the manifolds without heat exchange of the fuel gas in the heat exchange part.

(3) As the manifolds for the flows of the fuel gas and the oxidant gas in the stacking direction of the fuel cell stack, the inner gas flow passages may be axially formed in the bolts up to both ends of the fuel cell stack.

It is feasible to provide sufficient gas flow spaces (e.g. cylindrical spaces) between the bolts and the bolt insertion holes and permit flows (supply and discharge) of the fuel gas and the oxidant gas between the outside and the fuel cells through such spaces.

It is also feasible to use solid bolts as the bolts and provide sufficient gas flow spaces (e.g. cylindrical spaces) between the bolts and the bolt insertion holes and permit flows (supply and discharge) of the fuel gas and the oxidant gas between the outside and the fuel cells through such spaces.

The gas flows between the outside and the above spaces can be established by forming axial grooves in outer circumferential surfaces of the bolts.

The type of the fuel cells is not limited to the solid oxide fuel cells (SOFC). The effects of the present invention can be obtained when the fuel cell stack of the type (e.g. solid oxide type, phosphoric acid type, molten carbonate type etc.) that reaches a high temperature (e.g. 150 to 1000° C. during operation).

The invention claimed is:

1. A fuel cell stack comprising a plurality of fuel cells stacked together in a stacking direction, each of the fuel cells having a solid electrolyte layer, a fuel electrode layer disposed on one side of the solid electrolyte layer and brought into contact with fuel gas and an air electrode layer disposed on the other side of the solid electrolyte layer and brought into contact with oxidant gas, the fuel cell stack having a structure that allows at least one of the fuel gas and the oxidant gas to flow into a part of the fuel cells in the staking direction and allows at least one of the fuel gas and the oxidant gas discharged from the part of the fuel cells to flow into the remaining part of the fuel cells, wherein the fuel cell stack comprises:
a heat exchange part located inside the solid oxide fuel cell stack to perform heat exchange with any of the fuel cells adjacent to the heat exchange part; and
a plurality of manifolds passing through the fuel cells in the stacking direction so as to allow at least one of the fuel gas and the oxidant gas to flow therethrough;
wherein the manifolds include:
cold gas manifolds each adapted to introduce the fuel gas or the oxidant gas from the outside into the fuel cell stack;
hot gas manifolds each adapted to discharge the fuel gas or the oxidant gas from the fuel cells; and
a heat-exchanged gas manifold adapted to feed to the plurality of fuel cells at least one of the fuel gas and the oxidant gas that has been heat-exchanged in the heat exchange part; and wherein, when the fuel cell stack is viewed in the stacking direction, the manifolds are arranged such that every one of the cold gas manifolds is adjacent to any of the hot gas manifolds and such that every one of the hot gas manifolds is non-adjacent to any other one of the hot gas manifolds.

2. The fuel cell stack according to claim 1, wherein, when the fuel cell stack is viewed in the stacking direction, at least either of the heat-exchanged gas manifold and the cold gas manifolds is adjacent to each of the hot gas manifolds.

3. The fuel cell stack according to claim 2, wherein, when the fuel cell stack is viewed in the stacking direction, at least any of the heat-exchanged gas manifold and the cold gas manifolds are adjacent to both sides of each of the hot gas manifolds.

4. The fuel cell stack according to claim 1, wherein, when the fuel cell stack is viewed in the stacking direction, the cold-gas manifold for the oxidant gas is adjacent to the hot-gas manifold for the oxidant gas.

5. The fuel cell stack according to claim 1, wherein, when the fuel cell stack is viewed in the stacking direction, the hot-gas manifolds are adjacent to both sides of the cold-gas manifold for the oxidant gas.

6. The fuel cell stack according to claim 1, wherein the respective manifolds are arranged along a perimeter of the fuel cell stack, and when the fuel cell stack is viewed in the stacking direction, the manifolds in any given side of the fuel cell stack are arranged such that every one of the cold gas manifolds is adjacent to any of the hot gas manifolds and such that every one of the hot gas manifolds is non-adjacent to any other one of the hot gas manifolds.

7. A fuel cell module comprising the fuel cell stack according to claim 1.

* * * * *